US009367139B2

(12) United States Patent
Ataee et al.

(10) Patent No.: US 9,367,139 B2
(45) Date of Patent: Jun. 14, 2016

(54) SYSTEMS, ARTICLES, AND METHODS FOR GESTURE IDENTIFICATION IN WEARABLE ELECTROMYOGRAPHY DEVICES

(71) Applicant: Thalmic Labs Inc., Kitchener (CA)

(72) Inventors: Pedram Ataee, Waterloo (CA); Idris S. Aleem, Pickering (CA); Matthew Bailey, Kitchener (CA)

(73) Assignee: THALMIC LABS INC., Kitchener (CA)

( * ) Notice: Subject to any disclaimer, the term of this patent is extended or adjusted under 35 U.S.C. 154(b) by 5 days.

(21) Appl. No.: 14/567,826

(22) Filed: Dec. 11, 2014

(65) Prior Publication Data

US 2015/0169074 A1    Jun. 18, 2015

Related U.S. Application Data

(60) Provisional application No. 61/915,338, filed on Dec. 12, 2013.

(51) Int. Cl.
*G06F 3/01*     (2006.01)
*G06F 3/0346*   (2013.01)

(52) U.S. Cl.
CPC .............. *G06F 3/017* (2013.01); *G06F 3/014* (2013.01); *G06F 3/015* (2013.01); *G06F 3/016* (2013.01); *G06F 3/0346* (2013.01)

(58) Field of Classification Search
CPC ....... G06F 3/017; G06F 3/0346; G06F 3/015; G06F 3/016; G06F 3/014; G06T 7/2033
See application file for complete search history.

(56) References Cited

U.S. PATENT DOCUMENTS

| 2006/0121958 | A1* | 6/2006 | Jung | G06F 3/015 |
| | | | | 455/575.1 |
| 2009/0327171 | A1* | 12/2009 | Tan | G06F 3/015 |
| | | | | 706/12 |
| 2012/0157789 | A1* | 6/2012 | Kangas | A61B 5/7228 |
| | | | | 600/300 |

* cited by examiner

*Primary Examiner* — Premal Patel
(74) *Attorney, Agent, or Firm* — Seed IP Law Group PLLC

(57) ABSTRACT

Systems, articles, and methods perform gesture identification with limited computational resources. A wearable electromyography ("EMG") device includes multiple EMG sensors, an on-board processor, and a non-transitory processor-readable memory storing data and/or instructions for performing gesture identification. The wearable EMG device detects signals when a user performs a physical gesture and characterizes a signal vector $\vec{s}$ based on features of the detected signals. A library of gesture template vectors G is stored in the memory of the wearable EMG device and a respective property of each respective angle $\theta_i$ formed between the signal vector $\vec{s}$ and respective ones of the gesture template vectors $\vec{g}_i$ is analyzed to match the direction of the signal vector $\vec{s}$ to the direction of a particular gesture template vector $\vec{g}*$. The accuracy of the gesture identification may be enhanced by performing multiple iterations across multiple time-synchronized portions of the EMG signal data.

31 Claims, 6 Drawing Sheets

SYSTEMS, ARTICLES, AND METHODS FOR GESTURE IDENTIFICATION IN WEARABLE ELECTROMYOGRAPHY DEVICES

BACKGROUND

1. Technical Field

The present systems, articles, and methods generally relate to wearable electromyography devices that perform automated gesture identification in real-time with limited computational resources.

2. Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Human-Electronics Interfaces

A wearable electronic device may provide direct functionality for a user (such as audio playback, data display, computing functions, etc.) or it may provide electronics to interact with, communicate with, or control another electronic device. For example, a wearable electronic device may include sensors that detect inputs effected by a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, articles, and methods may be applied to HCIs, but may also be applied to any other form of human-electronics interface.

Electromyography Devices

Electromyography ("EMG") is a process for detecting and processing the electrical signals generated by muscle activity. EMG devices employ EMG sensors that are responsive to the range of electrical potentials (typically $\mu V-mV$) involved in muscle activity. EMG signals may be used in a wide variety of applications, including: medical monitoring and diagnosis, muscle rehabilitation, exercise and training, fatigue monitoring, prosthetic control, and even in controlling functions of electronic devices.

Human-electronics interfaces that employ EMG have been proposed. For example, U.S. Pat. No. 6,244,873 and U.S. Pat. No. 8,170,656 describe such systems. In a typical example, a user dons a wearable EMG device and performs physical gestures to control functions of a separate electronic device. EMG signals corresponding to each user-performed gesture are detected by the wearable EMG device and then either processed by the wearable EMG device itself using an on-board processor or transmitted to a separate computer system for processing. In either case, processing the EMG signals typically involves automatically identifying the corresponding gesture(s) performed by the user. It is advantageous to perform gesture identification on-board the wearable EMG device itself (i.e., using an on-board processor) because doing so enables a wider-range of electronic devices to be controlled.

Automated gesture identification based on EMG signal data is a challenging computational problem that may employ techniques from the fields of signal processing, pattern recognition, machine learning, and artificial intelligence. The algorithms involved typically include computationally intensive calculations such as non-linear optimizations, stochastic analyses, and so on. Such calculations can demand significant processing power, necessitating both a fast processor that is capable of performing such calculations in a reasonable amount of time and sufficient infrastructure to support the memory, electrical power, and cooling power requirements of the fast processor.

In a wearable electronic device, it is advantageous to minimize the total weight of the device and maximize the total battery life. Supporting a fast processor (and associated memory) that performs computationally intensive calculations on-board a wearable device can either require a bigger, heavier battery or significantly reduce the available battery life. A fast processor may also require a bulky cooling system. Furthermore, even with all of the support systems necessary to perform such computations on-board a wearable device, algorithms that involve computationally intensive calculations may still proceed unacceptably slowly for the purpose of real-time automated gesture identification in an HCI. As an alternative to processing on-board, the wearable device, data may be wirelessly transmitted to another device for processing. But in this scenario, the wireless communications themselves can be unduly time-consuming and also very consumptive of battery power. There is a need in the art for wearable devices that can perform automated gesture identification in real-time using limited computational resources.

BRIEF SUMMARY

A method of operating a wearable electromyography ("EMG") device, wherein the wearable EMG device includes a set of EMG sensors and a processor communicatively coupled to the set of EMG sensors, may be summarized as including: detecting muscle activity of a user of the wearable EMG device by the set of EMG sensors, wherein the muscle activity corresponds to a user-performed gesture; in response to detecting muscle activity of the user by the set of EMG sensors, providing a set of signals from the set of EMG sensors to the processor; characterizing the set of signals as a first signal vector $\vec{s}_1$ by the processor; determining a property of a first angle $\theta_1$ formed between the first signal vector $\vec{s}_1$ and a first gesture template vector $\vec{g}_1$ by the processor, wherein the first gesture template vector $\vec{g}_1$ represents a first gesture; and identifying the user-performed gesture by the processor, wherein identifying the user-performed gesture by the processor includes identifying the first gesture as the user-performed gesture by the processor if, at least, the property of the first angle $\theta_1$ satisfies a criterion. Characterizing the set of signals as a first signal vector $\vec{s}_1$ by the processor may include determining at least one feature of each signal in the set of signals by the processor. Determining at least one feature of each signal in the set of signals by the processor may include determining, by the processor and for each signal in the set of signals, at least one feature selected from the group consisting of: an average value of the signal, a mean value of the signal, a median value of the signal, a mode value of the signal, a maximum value of the signal, a minimum value of the signal, a standard deviation of the signal, a mean power frequency of the signal, and a root mean squared ("RMS") value of the signal. Determining a property of a first angle $\theta_1$ formed between the first signal vector $\vec{s}_1$ and a first gesture template vector $\vec{g}_1$ by the processor may include determining, by the processor, at least one property selected from the group consisting of: a magnitude of the first angle $\theta_1$, a cosine of the first angle $\theta_1$, and a sine of the first angle $\theta_1$.

If the property of the first angle $\theta_1$ does not satisfy the criterion, the method may further include determining a property of a second angle $\theta_2$ formed between the first signal vector $\vec{s}_1$ and a second gesture template vector $\vec{g}_2$ by the processor, wherein the second gesture template vector $\vec{g}_2$ represents a second gesture, and in this case identifying the user-performed gesture by the processor may include identifying the second gesture as the user-performed gesture by the processor if, at least, the property of the second angle $\theta_2$ satisfies the criterion. If the property of the second angle $\theta_2$ does not satisfy the criterion, the method may further include, until an angle $\theta^*$ having a property that satisfies the criterion is identified, iteratively: determining a property of an angle $\theta_i$ formed between the first signal vector $\vec{s}_1$ and an $i^{th}$ gesture template vector $\vec{g}_i$ by the processor, wherein i>2 and the $i^{th}$ gesture template vector $\vec{g}_i$ represents an $i^{th}$ gesture; and, in response to identifying an angle $\theta^*$ having a property that satisfies the criterion, identifying the user-performed gesture by the processor may include: stopping the iteration; and identifying, by the processor, the gesture that is represented by the gesture template vector $\vec{g}^*$ corresponding to the angle $\theta^*$ that satisfies the criterion as the user-performed gesture.

The method may further include: for each gesture template vector $\vec{g}_i$ in a library of gesture template vectors G, each gesture template vector $\vec{g}_i$ representing a respective gesture, determining a property of an angle $\theta_i$ formed between the first signal vector $\vec{s}_1$ and the gesture template vector $\vec{g}_i$ by the processor, wherein determining a property of an angle $\theta_i$ formed between the first signal vector $\vec{s}_1$ and the gesture template vector $\vec{g}_i$ by the processor for each gesture template vector $\vec{g}_i$ in the library of gesture template vectors G includes determining a property of a first angle $\theta_1$ formed between the first signal vector and a first gesture template vector $\vec{g}_1$ by the processor; and wherein: identifying the user-performed gesture by the processor includes identifying, by the processor, a gesture represented by a gesture template vector $\vec{g}_i$ from the library of gesture template vectors G for which the property of the angle $\theta_i$ satisfies a criterion, wherein identifying, by the processor, a gesture represented by a gesture template vector $\vec{g}_i$ from the library of gesture template vectors G for which the property of the angle $\theta_i$ satisfies a criterion includes identifying the first gesture as the user-performed gesture by the processor if, at least: i) the property of the first angle $\theta_1$ satisfies the criterion and ii) the property of the first angle $\theta_1$ better satisfies the criterion than the property of any other angle $\theta_i$. Identifying, by the processor, a gesture represented by a gesture template vector $\vec{g}_i$ from the library of gesture template vectors G for which the property of the angle $\theta_i$ satisfies a criterion may include either: identifying, by the processor, the gesture template vector $\vec{g}_i$ from the library of gesture template vectors G having the angle $\theta_i$ with a greatest property; or identifying, by the processor, the gesture template vector $\vec{g}_i$ from the library of gesture template vectors G having the angle $\theta_i$ with a smallest property.

The wearable EMG device may further include at least one inertial sensor, and the method may further include: detecting motion of the wearable EMG device by the at least one inertial sensor, wherein the motion corresponds to the user-performed gesture; in response to detecting motion of the wearable EMG device by the at least one inertial sensor, providing at least one signal from the at least one inertial sensor to the processor; and processing the at least one signal from the at least one inertial sensor by the processor, and wherein identifying the user-performed gesture by the processor includes identifying the user-performed gesture by the processor based at least in part on an outcome of the processing the at least one signal from the at least one inertial sensor by the processor.

The method may further include: capturing a respective time-synchronized first portion of each signal in the set of signals by the processor, wherein characterizing the set of signals as a first signal vector $\vec{s}_1$ by the processor includes characterizing the time-synchronized first portions of the signals in the set of signals as the first signal vector $\vec{s}_1$ by the processor; capturing a respective time-synchronized second portion of each signal in the set of signals by the processor; characterizing the time-synchronized second portions of the signals in the set of signals as a second signal vector $\vec{s}_2$ by the processor; determining a property of a second angle $\phi_1$ formed between the second signal vector $\vec{s}_2$ and the first gesture template vector $\vec{g}_1$ by the processor; and wherein: identifying the user-performed gesture by the processor includes identifying the first gesture as the user-performed gesture by the processor if, at least: i) the property of the first angle $\theta_1$ satisfies the criterion, and ii) the property of the second angle $\phi_1$ satisfies the criterion. The method may further include: capturing a respective time-synchronized at least one additional portion of each signal in the set of signals by the processor; characterizing the time-synchronized at least one additional portions of the signals in the set of signals as at least one additional signal vector $\vec{s}_{add}$ by the processor; determining a property of at least one additional angle $\psi_1$ formed between the at least one additional signal vector $\vec{s}_{add}$ and the first gesture template vector $\vec{g}_1$ by the processor; and wherein: identifying the user-performed gesture by the processor includes identifying the first gesture as the user-performed gesture by the processor if, at least: i) the property of the first angle $\theta_1$ satisfies the criterion, ii) the property of the second angle $\phi_1$ satisfies the criterion, and iii) the property of the at least one additional angle $\psi_1$ satisfies the criterion.

The wearable EMG device may further include a non-transitory processor-readable storage medium communicatively coupled to the processor, wherein the non-transitory processor-readable storage medium stores processor-executable gesture identification instructions, and: characterizing the set of signals as a first signal vector $\vec{s}_1$ by the processor may include executing, by the processor, a portion (e.g., a first portion) of the processor-executable gesture identification instructions to cause the processor to characterize the set of signals as a first signal vector $\vec{s}_1$; determining a property of a first angle $\theta_1$ formed between the first signal vector $\vec{s}_1$ and a first gesture template vector $\vec{g}_1$ by the processor may include executing, by the processor, a portion (e.g., a second portion) of the processor-executable gesture identification instructions to cause the processor to determine a property of a first angle $\theta_1$ formed between the first signal vector $\vec{s}_1$ and a first gesture template vector $\vec{g}_1$; and identifying the user-performed gesture by the processor may include executing, by the processor, a portion (e.g., a third portion) of the processor-executable gesture identification instructions to cause the processor to identify the user-performed gesture.

The method may further include: in response to the user performing a reference gesture: determining an orientation of the wearable EMG device on the user by the wearable EMG device; and calibrating the first gesture template vector $\vec{g}_1$ by the wearable EMG device. The set of EMG sensors may include N EMG sensors, and: providing a set of signals from the set of EMG sensors to the processor may include providing N signals from the set of EMG sensors to the processor; characterizing the set of signals as a first signal vector $\vec{s}_1$ by the processor may include characterizing the set of signals as a first signal vector $\vec{s}_1$ in an N-dimensional space by the processor; and determining a property of a first angle $\theta_1$ formed between the first signal vector $\vec{s}_1$ and a first gesture template vector $\vec{g}_1$ by the processor may include determining a property of a first angle $\theta_1$ formed between the first signal vector $\vec{s}_1$ and a first gesture template vector $\vec{g}_1$ in the N-dimensional space by the processor.

A wearable electromyography ("EMG") device may be summarized as including: a set of EMG sensors responsive to (i.e., to detect) muscle activity of a user of the wearable EMG device, the muscle activity corresponding to a user-performed gesture, wherein in response to the muscle activity the set of EMG sensors provide a set of signals; a processor communicatively coupled to the set of EMG sensors; and a non-transitory processor-readable storage medium communicatively coupled to the processor, wherein the non-transitory processor-readable storage medium stores processor-executable gesture identification instructions that, when executed by the processor, cause the processor to: characterize the set of signals as a first signal vector $\vec{s}_1$; determine a property of a first angle $\theta_1$ formed between the first signal vector $\vec{s}_1$ and a first gesture template vector $\vec{g}_1$, wherein the first gesture template vector $\vec{g}_1$ represents a first gesture; and identify the user-performed gesture, wherein identifying the user-performed gesture includes identifying the first gesture as the user-performed if, at least, the property of the first angle $\theta_1$ satisfies a criterion. The wearable EMG device may further include: at least one communication terminal communicatively coupled to the processor, the at least one communication terminal to transmit information about the user-performed gesture to a receiving device. The wearable EMG device may further include at least one inertial sensor communicatively coupled to the processor, the at least one inertial sensor responsive to (i.e., to detect) motion corresponding to the user-performed gesture, wherein in response to motion the inertial sensor provides at least one signal, and wherein the processor-executable gesture identification instructions that, when executed by the processor, cause the processor to identify the user-performed gesture cause the processor to identify the user-performed gesture based at least in part on the at least one signal provided by the at least one inertial sensor in response to the detected motion. The wearable EMG device may further include a set of pod structures that form physically coupled links of the wearable EMG device, wherein each pod structure in the set of pod structures is positioned adjacent and in between two other pod structures in the set of pod structures and physically coupled to the two other pod structures in the set of pod structures, and wherein the set of pod structures forms a perimeter of an annular configuration.

A method of operating a wearable electromyography ("EMG") device, wherein the wearable EMG device includes a set of EMG sensors and a processor communicatively coupled to the set of EMG sensors, may be summarized as including: detecting muscle activity of a user of the wearable EMG device by the set of EMG sensors, wherein the muscle activity corresponds to a user-performed gesture; in response to detecting muscle activity of the user by the set of EMG sensors, providing a set of signals from the set of EMG sensors to the processor; characterizing the set of signals as a first signal vector $\vec{s}_1$ by the processor; for each gesture template vector $\vec{g}_i$ in a library of gesture template vectors G, each gesture template vector $\vec{g}_i$ representing a respective gesture, determining, by the processor, a property of an angle $\theta_i$ formed between the first signal vector $\vec{s}_1$ and the gesture template vector $\vec{g}_i$; and identifying the user-performed gesture by the processor based at least in part on the property of at least one angle $\theta_i$ formed between the first signal vector $\vec{s}_1$ and a gesture template vector $\vec{g}_i$. Characterizing the set of signals as a first signal vector $\vec{s}_1$ by the processor may include determining at least one feature of each signal in the set of signals by the processor. Determining at least one feature of each signal in the set of signals by the processor may include determining, by the processor and for each signal in the set of signals, at least one feature selected from the group consisting of: an average value of the signal, a mean value of the signal, a median value of the signal, a mode value of the signal, a maximum value of the signal, a minimum value of the signal, a standard deviation of the signal, a mean power frequency of the signal, and a root mean squared ("RMS") value of the signal. Determining, for each gesture template vector $\vec{g}_i$ in a library of gesture template vectors G, a property of an angle $\theta_i$ formed between the first signal vector $\vec{s}_1$ and the gesture template vector $\vec{g}_i$ by the processor may include determining, by the processor and for each gesture template vector $\vec{g}_i$ in the library of gesture template vectors G, at least one property selected from the group consisting of: a magnitude of the angle $\theta_i$, a cosine of the angle $\theta_i$, and a sine of the angle $\theta_i$.

Determining, for each gesture template vector $\vec{g}_i$ in a library of gesture template vectors G, a property of an angle $\theta_i$ formed between the first signal vector $\vec{s}_1$ and the gesture template vector $\vec{g}_i$ by the processor may include determining a property of a first angle $\theta_1$ formed between the first signal vector $\vec{s}_1$ and a first gesture template vector $\vec{g}_1$ by the processor, wherein the first gesture template vector $\vec{g}_1$ represents a first gesture, and wherein: identifying the user-performed gesture by the processor based at least in part on the property of at least one angle $\theta_i$ formed between the first signal vector $\vec{s}_1$ and a gesture template vector $\vec{g}_i$ includes identifying the first gesture as the user-performed gesture by the processor if, at least, the property of the first angle $\theta_1$ satisfies a criterion. Identifying the user-performed gesture by the processor based at least in part on the property of at least one angle $\theta_i$ formed between the first signal vector $\vec{s}_1$ and a gesture template vector $\vec{g}_i$ may include either: identifying, by the processor, the gesture template vector $\vec{g}_i$ from the library of gesture template vectors G having the angle $\theta_i$ with a greatest property; or identifying, by the processor, the gesture template vector $\vec{g}_i$ from the library of gesture template vectors G having the angle $\theta_i$ with a smallest property.

The wearable EMG device may further include at least one inertial sensor, and the method may further include: detecting motion of the wearable EMG device by the at least one inertial sensor, wherein the motion corresponds to the user-performed gesture; in response to detecting motion of the wearable EMG device by the at least one inertial sensor, providing at least one signal from the at least one inertial sensor to the processor; and processing the at least one signal from the at least one inertial sensor by the processor, and wherein identifying the user-performed gesture by the processor based at least in part on the property of at least one angle $\theta_i$ formed between the first signal vector $\vec{s}_1$ and a gesture template vector $\vec{g}_i$ includes identifying the user-performed gesture by the processor based at least in part on an outcome of the processing the at least one signal from the at least one inertial sensor by the processor.

The method may further include: capturing a respective time-synchronized first portion of each signal in the set of signals by the processor, wherein characterizing the set of signals as a first signal vector $\vec{s}_1$ by the processor includes characterizing the time-synchronized first portions of the signals in the set of signals as the first signal vector $\vec{s}_1$ by the processor; capturing a respective time-synchronized second portion of each signal in the set of signals by the processor; characterizing the time-synchronized second portions of the signals in the set of signals as a second signal vector $\vec{s}_2$ by the processor; and for each gesture template vector $\vec{g}_i$ in the library of gesture template vectors G, determining, by the processor, a property of an angle $\phi_i$ formed between the second signal vector $\vec{s}_2$ and the gesture template vector $\vec{g}_i$; and wherein: identifying the user-performed gesture by the processor based at least in part on the property of at least one angle $\theta_i$ formed between the first signal vector $\vec{s}_1$ and a gesture template vector $\vec{g}_i$ includes identifying the user-performed gesture by the processor based at least in part on both i) the property of at least one angle $\theta_i$ formed between the first signal vector $\vec{s}_1$ and a gesture template vector $\vec{g}_i$, and ii) the property of at least one angle $\phi_i$ formed between the second signal vector $\vec{s}_2$ and a gesture template vector $\vec{g}_i$. The method may further include: capturing a respective time-synchronized at least one additional portion of each signal in the set of signals by the processor; characterizing the time-synchronized at least one additional portions of the signals in the set of signals as at least one additional signal vector $\vec{s}_{add}$ by the processor; and for each gesture template vector $\vec{g}_i$ in the library of gesture template vectors G, determining, by the processor, a property of an angle $\psi_i$ formed between the at least one additional signal vector $\vec{s}_{add}$ and the gesture template vector $\vec{g}_i$; and wherein: identifying the user-performed gesture by the processor based at least in part on both i) the property of at least one angle $\theta_i$ formed between the first signal vector $\vec{s}_1$ and a gesture template vector $\vec{g}_i$, and ii) the property of at least one angle $\phi_i$ formed between the second signal vector $\vec{s}_2$ and a gesture template vector $\vec{g}_i$ includes identifying the user-performed gesture by the processor based at least in part on all of: i) the property of at least one angle $\theta_i$ formed between the first signal vector $\vec{s}_1$ and a gesture template vector $\vec{g}_i$, ii) the property of at least one angle $\phi_i$ formed between the second signal vector $\vec{s}_2$ and a gesture template vector $\vec{g}_i$, and iii) the property of at least one angle $\psi_i$ formed between the at least one additional signal vector $\vec{s}_{add}$ and a gesture template vector $\vec{g}_i$.

The wearable EMG device may further include a non-transitory processor-readable storage medium communicatively coupled to the processor, wherein the non-transitory processor-readable storage medium stores processor-executable gesture identification instructions, and: characterizing the set of signals as a first signal vector $\vec{s}_1$ by the processor may include executing, by the processor, a portion (e.g., a first portion) of the processor-executable gesture identification instructions to cause the processor to characterize the set of signals as a first signal vector $\vec{s}_1$; determining, by the processor, a property of an angle $\theta_i$ formed between the first signal vector $\vec{s}_1$ and the gesture template vector $\vec{g}_i$ for each gesture template vector $\vec{g}_i$ in a library of gesture template vectors G may include executing, by the processor, a portion (e.g., a second portion) of the processor-executable gesture identification instructions to cause the processor to determine a property of an angle $\theta_i$ formed between the first signal vector $\vec{s}_1$ and the gesture template vector $\vec{g}_i$ for each gesture template vector $\vec{g}_i$ in the library of gesture template vectors G; and identifying the user-performed gesture by the processor based at least in part on the property of at least one angle $\theta_i$ formed between the first signal vector $\vec{s}_1$ and a gesture template vector $\vec{g}_i$ may include executing, by the processor, a portion (e.g., a third portion) of the processor-executable gesture identification instructions to cause the processor to identify the user-performed gesture by the processor based at least in part on the property of at least one angle $\theta_i$ formed between the first signal vector $\vec{s}_1$ and a gesture template vector $\vec{g}_i$.

The method may further include, in response to the user performing a reference gesture: determining an orientation of the wearable EMG device on the user by the wearable EMG device; and calibrating each gesture template vector $\vec{g}_i$ in the library of gesture template vectors G by the wearable EMG device. The set of EMG sensors may include N EMG sensors and: providing a set of signals from the set of EMG sensors to the processor may include providing N signals from the set of EMG sensors to the processor; characterizing the set of signals as a first signal vector $\vec{s}_1$ by the processor may include characterizing the set of signals as a first signal vector $\vec{s}_1$ in an N-dimensional space by the processor; and determining, by the processor, a property of an angle $\theta_i$ formed between the first signal vector $\vec{s}_1$ and the gesture template vector $\vec{g}_i$ for each gesture template vector $\vec{g}_i$ in a library of gesture template vectors G may include determining, by the processor, a property of an angle $\theta_i$ formed between the first signal vector $\vec{s}_1$ and the gesture template vector $\vec{g}_i$ for each gesture template vector $\vec{g}_i$ in a library of gesture template vectors G in the N-dimensional space.

A wearable electromyography ("EMG") device may be summarized as including: a set of EMG sensors responsive to (i.e., to detect) muscle activity of a user of the wearable EMG device, the muscle activity corresponding to a user-performed gesture, wherein in response to the muscle activity the set of EMG sensors provide a set of signals; a processor communicatively coupled to the set of EMG sensors; and a non-transitory processor-readable storage medium communicatively coupled to the processor, wherein the non-transitory processor-readable storage medium stores processor-executable gesture identification instructions that, when executed by the processor, cause the processor to: characterize the set of signals as a first signal vector $\vec{s}_1$; for each gesture template vector $\vec{g}_i$ in a library of gesture template vectors G, each gesture template vector $\vec{g}_i$ representing a respective gesture, determine a property of an angle $\theta_i$ formed between the first signal vector $\vec{s}_1$ and the gesture template vector $\vec{g}_i$; and identify the user-performed gesture based at least in part on the property of at least one angle $\theta_i$ formed between the first signal vector $\vec{s}_1$ and at least one gesture template vector $\vec{g}_i$. The wearable EMG device may further include at least one communication terminal communicatively coupled to the processor, the at least one communication terminal to transmit information about the user-performed gesture to a receiving device. The wearable EMG device may further include at least one inertial sensor communicatively coupled to the processor, the at least one inertial sensor responsive to (i.e., to detect) motion corresponding to the user-performed gesture, wherein in response to motion the at least one inertial sensor provides at least one signal, and wherein the processor-executable gesture identification instructions that, when executed by the processor, cause the processor to identify the user-performed gesture based at least in part on the property of at least one angle $\theta_i$ formed between the first signal vector $\vec{s}_1$ and at least one gesture template vector $\vec{g}_i$ cause the processor to identify the user-performed gesture based at least in part on both: i) the property of at least one angle $\theta_i$ formed between the first signal vector $\vec{s}_1$ and at least one gesture template vector $\vec{g}_i$, and ii) the at least one signal provided by the at least one inertial sensor in response to the detected motion. The wearable EMG device may further include a set of pod structures that form physically coupled links of the wearable EMG device, wherein each pod structure in the set of pod structures is positioned adjacent and in between two other pod structures in the set of pod structures and physically coupled to the two other pod structures in the set of pod structures, and wherein the set of pod structures forms a perimeter of an annular configuration.

A method of operating a wearable electromyography ("EMG") device, wherein the wearable EMG device includes a set of EMG sensors and a processor communicatively coupled to the set of EMG sensors, may be summarized as including: detecting muscle activity of a user of the wearable EMG device by the set of EMG sensors, wherein the muscle activity corresponds to a user-performed gesture; in response to detecting muscle activity of the user by the set of EMG sensors, providing a set of signals from the set of EMG sensors to the processor; until a same gesture is nominated as the user-performed gesture M times, where M≥2, iteratively: capturing a respective time-synchronized portion of each signal in the set of signals by the processor; characterizing the time-synchronized portions of the signals in the set of signals as a signal vector $\vec{s}$ by the processor; for each gesture template vector $\vec{g}_i$ in a library of gesture template vectors G, each gesture template vector $\vec{g}_i$ representing a respective gesture, determining, by the processor, a property of an angle $\theta_i$ formed between the signal vector $\vec{s}$ and the gesture template vector $\vec{g}_i$; and nominating, by the processor, a gesture as the user-performed gesture based on the determining, for each gesture template vector $\vec{g}_i$ in a library of gesture template vectors G, a property of an angle $\theta_i$ formed between the signal vector $\vec{s}$ and the gesture template vector $\vec{g}_i$; and in response to nominating a same gesture as the user-performed gesture M times: stopping the iteration; and identifying, by the processor, the user-performed gesture as the gesture that is nominated as the user-performed gesture M times. Characterizing the time-synchronized portions of the signals in the set of signals as a signal vector $\vec{s}$ by the processor may include determining a respective feature of each respective time-synchronized portion of each signal in the set of signals by the processor. Determining a respective feature of each respective time-synchronized portion of each signal in the set of signals by the processor may include determining, by the processor and for each time-synchronized portion of each signal in the set of signals, at least one feature selected from the group consisting of: an average value of the time-synchronized portion of the signal, a mean value of the time-synchronized portion of the signal, a median value of the time-synchronized portion of the signal, a mode value of the time-synchronized portion of the signal, a maximum value of the time-synchronized portion of the signal, a minimum value of the time-synchronized portion of the signal, a standard deviation of the time-synchronized portion of the signal, a mean power frequency of the time-synchronized portion of the signal, and a root mean squared ("RMS") value of the time-synchronized portion of the signal.

The wearable EMG device may further include at least one inertial sensor, and the method may further include: detecting motion of the wearable EMG device by the at least one inertial sensor, wherein the motion corresponds to the user-performed gesture; in response to detecting motion of the wearable EMG device by the at least one inertial sensor, providing at least one signal from the at least one inertial sensor to the processor; processing the at least one signal from the at least one inertial sensor by the processor; and identifying, by the processor, the user-performed gesture based at least in part on both: i) the gesture that is nominated as the user-performed gesture M times, and ii) an outcome of the processing the at least one signal from the at least one inertial sensor by the processor. For each gesture template vector $\vec{g}_i$ in a library of gesture template vectors G, determining, by the processor, a property of an angle $\theta_i$ formed between the signal vector $\vec{s}$ and the gesture template vector $\vec{g}_i$ may include determining, by the processor, at least one property selected from the group consisting of: a magnitude of the angle $\theta_i$, a cosine of the angle $\theta_i$, and a sine of the angle $\theta_i$.

Nominating, by the processor, a gesture as the user-performed gesture based on the determining, for each gesture template vector $\vec{g}_i$ in a library of gesture template vectors G, a property of an angle $\theta_i$ formed between the signal vector $\vec{s}$ and the gesture template vector $\vec{g}_i$ may include nominating, by the processor, a gesture represented by a gesture template vector $\vec{g}_i$ having an angle $\theta_i$ with a greatest property as the user-performed gesture. Nominating, by the processor, a gesture as the user-performed gesture based on the determining, for each gesture template vector $\vec{g}_i$ in a library of gesture template vectors G, a property of an angle $\theta_i$ formed between the signal vector $\vec{s}$ and the gesture template vector $\vec{g}_i$ may include nominating, by the processor, a gesture represented by a gesture template vector $\vec{g}_i$ having an angle $\theta_i$ with a smallest property as the user-performed gesture.

A wearable electromyography ("EMG") device may be summarized as including: a set of EMG sensors responsive to (i.e., to detect) muscle activity of a user of the wearable EMG device, the muscle activity corresponding to a user-performed gesture, wherein in response to the muscle activity the set of EMG sensors provide a set of signals; a processor communicatively coupled to the set of EMG sensors; and a non-transitory processor-readable storage medium communicatively coupled to the processor, wherein the non-transitory processor-readable storage medium stores processor-executable gesture identification instructions that, when executed by the processor, cause the processor to: i) until a same gesture is nominated as the user-performed gesture M times, where M≥2, iteratively: capture a respective time-synchronized portion of each signal in the set of signals; characterize the time-synchronized portions of the signals in the set of signals as a signal vector $\vec{s}$; for each gesture template vector $\vec{g}_i$ in a library of gesture template vectors G, each gesture template vector $\vec{g}_i$ representing a respective gesture, determine a property of an angle $\theta_i$ formed between the signal vector $\vec{s}$ and the gesture template vector $\vec{g}_i$; and nominate a gesture as the user-performed gesture based on determining, for each gesture template vector $\vec{g}_i$ in a library of gesture template vectors G, a property of an angle $\theta_i$ formed between the signal vector $\vec{s}$ and the gesture template vector $\vec{g}_i$; and in response to nominating a same gesture as the user-performed gesture M times: stop the iteration; and identify the user-performed gesture as the gesture that is nominated as the user-performed gesture M times. The wearable EMG device may further include at least one communication terminal communicatively coupled to the processor, the at least one communication terminal to transmit information about the user-performed gesture to a receiving device. The wearable EMG device may further include at least one inertial sensor communicatively coupled to the processor, the at least one inertial sensor responsive to (i.e., to detect) motion corresponding to the user-performed gesture, wherein in response to motion the at least one inertial sensor provides at least one signal, and wherein the processor-executable gesture identification instructions, when executed by the processor, cause the processor to identify the user-performed gesture based at least in part on both: i) the gesture that is nominated as the user-performed gesture M times, and ii) an outcome of the processing the at least one signal from the at least one inertial sensor by the processor. The wearable EMG device may further include a set of pod structures that form physically coupled links of the wearable EMG device, wherein each pod structure in the set of pod structures is positioned adjacent and in between two other pod structures in the set of pod structures and physically coupled to the two other pod structures in the set of pod structures, and wherein the set of pod structures forms a perimeter of an annular configuration.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
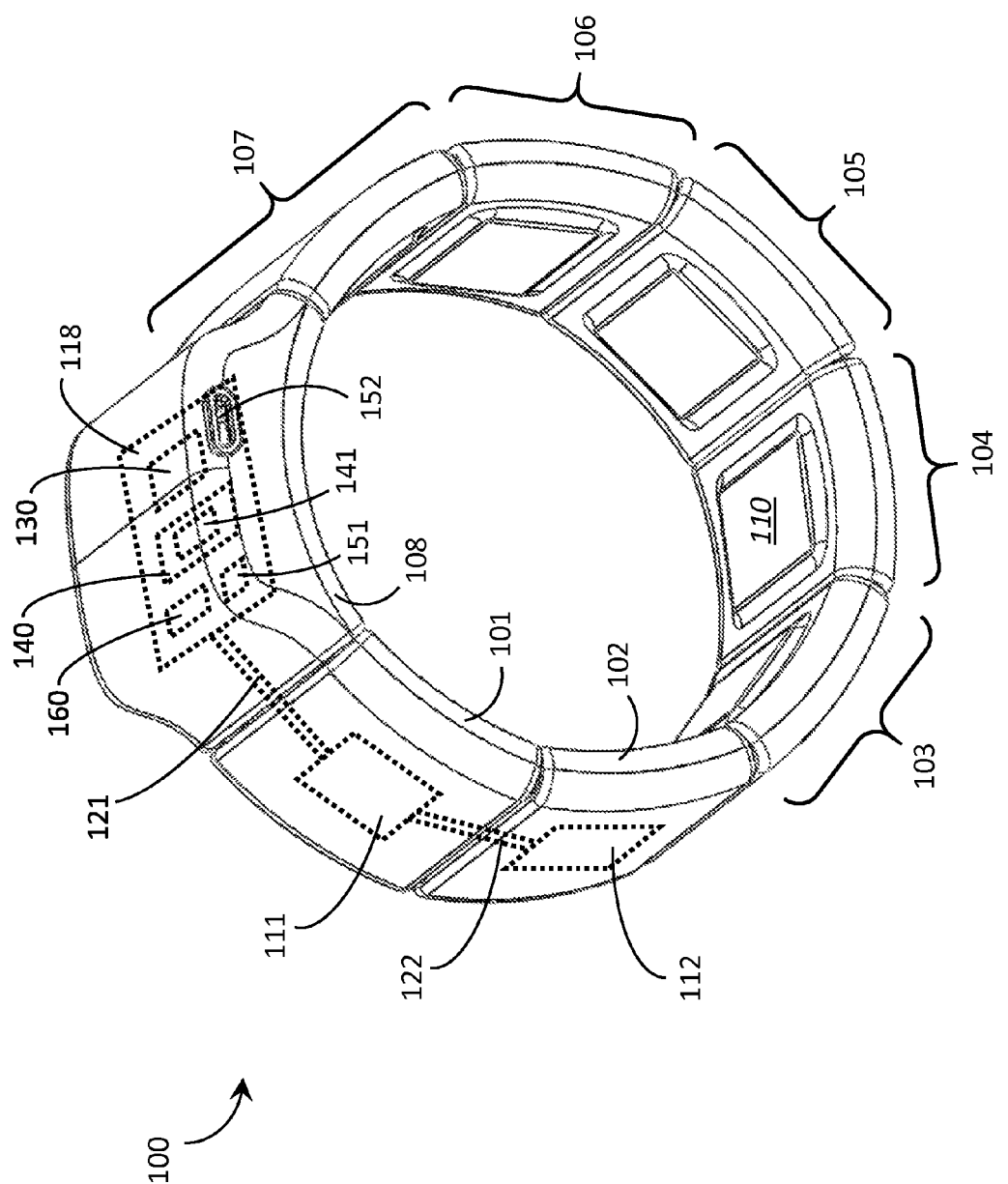
FIG. 1 is a perspective view of an exemplary wearable EMG device that performs gesture identification with limited computational resources in accordance with the present systems, articles, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, articles, and methods for performing automated gesture identification in real-time using at least one wearable EMG device. Each example of a wearable EMG device described herein provides reliable, accurate and robust real-time gesture identification using limited computational resources, which provides numerous benefits including without limitation: extending the battery life of the device, enhancing the speed of the gesture identification process, enhancing the quality of the gesture identification, simplifying the on-board processor and associated infrastructure, reducing the cost of the device, and reducing the overall mass and complexity of the device.

While reference is often made herein to the advantage of implementing the present systems, articles, and methods in conjunction with limited computational resources, a person of skill in the art will appreciate that the teachings herein may also be to/with systems and/or devices that employ highly performant computational resources, such as high performance computing systems.

Throughout this specification and the appended claims, the term "gesture" is used to generally refer to a physical action (e.g., a movement, a stretch, a flex, a pose) performed or otherwise effected by a user. Any physical action performed or otherwise effected by a user that involves detectable muscle activity (detectable, e.g., by at least one appropriately positioned EMG sensor) and/or detectable motion (detectable, e.g., by at least one appropriately positioned inertial sensor, such as an accelerometer and/or a gyroscope) may constitute a gesture in the present systems, articles, and methods.

FIG. 1 is a perspective view of an exemplary wearable EMG device 100 that performs gesture identification with limited computational resources in accordance with the present systems, articles, and methods. Exemplary wearable EMG device 100 may, for example, form part of a human-electronics interface. Exemplary wearable EMG device 100 is an armband designed to be worn on the forearm of a user, though a person of skill in the art will appreciate that the teachings described herein may readily be applied in wearable EMG devices designed to be worn elsewhere on the body of the user, including without limitation: on the upper arm, wrist, hand, finger, leg, foot, torso, or neck of the user. Some details of exemplary wearable EMG device 100 are described in at least U.S. Provisional Patent Application Ser. No. 61/752,226 (now U.S. Non-Provisional patent application Ser. No. 14/155,107), U.S. Provisional Patent Application Ser. No. 61/768,322 (now U.S. Non-Provisional patent application Ser. No. 14/186,889), U.S. Provisional Patent Application Ser. No. 61/771,500 (now U.S. Non-Provisional patent application Ser. No. 14/194,252), U.S. Provisional Patent Application Ser. No. 61/909,786 (now U.S. Non-Provisional patent application Ser. No. 14/553,657), and U.S. Provisional Patent Application Ser. No. 61/869,526 (now U.S. Non-Provisional patent application Ser. No. 14/465,194), each of which is incorporated herein by reference in its entirety.

Device 100 includes a set of eight pod structures 101, 102, 103, 104, 105, 106, 107, and 108 that form physically coupled links of the wearable EMG device 100. Each pod structure in the set of eight pod structures 101, 102, 103, 104, 105, 106, 107, and 108 is positioned adjacent and in between two other pod structures in the set of eight pod structures such that the set of pod structures forms a perimeter of an annular or closed loop configuration. For example, pod structure 101 is positioned adjacent and in between pod structures 102 and 108 at least approximately on a perimeter of the annular or closed loop configuration of pod structures, pod structure 102 is positioned adjacent and in between pod structures 101 and 103 at least approximately on the perimeter of the annular or closed loop configuration, pod structure 103 is positioned adjacent and in between pod structures 102 and 104 at least approximately on the perimeter of the annular or closed loop configuration, and so on. Each of pod structures 101, 102, 103, 104, 105, 106, 107, and 108 is physically coupled to the two adjacent pod structures by at least one adaptive coupler (not visible in FIG. 1). For example, pod structure 101 is physically coupled to pod structure 108 by an adaptive coupler and to pod structure 102 by an adaptive coupler. The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 101, 102, 103, 104, 105, 106, 107, and 108 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 100 is depicted in FIG. 1 with the at least one adaptive coupler completely retracted and contained within the eight pod structures 101, 102, 103, 104, 105, 106, 107, and 108 (and therefore the at least one adaptive coupler is not visible in FIG. 1). Further details of adaptive coupling in wearable electronic devices are described in, for example, U.S. Provisional Application Ser. No. 61/860,063 (now U.S. Non-Provisional patent application Ser. No. 14/276,575), which is incorporated herein by reference in its entirety.

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure component, etc. of the wearable EMG device. For example, pod structures 101 and 102 of device 100 can each be moved or displaced relative to one another within the constraints imposed by the adaptive coupler providing adaptive physical coupling therebetween. The desire for pod structures 101 and 102 to be movable/displaceable relative to one another specifically arises because device 100 is a wearable EMG device that advantageously accommodates the movements of a user and/or different user forms.

Device 100 includes eight pod structures 101, 102, 103, 104, 105, 106, 107, and 108 that form physically coupled links thereof. Wearable EMG devices employing pod structures (e.g., device 100) are used herein as exemplary wearable EMG device designs, while the present systems, articles, and methods may be applied to wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 100 of FIG. 1, each of pod structures 101, 102, 103, 104, 105, 106, 107, and 108 comprises a respective housing having a respective inner volume. Each housing may be formed of substantially rigid material and may be optically opaque. Throughout this specification and the appended claims, the term "rigid" as in, for example, "substantially rigid material," is used to describe a material that has an inherent tendency to maintain or restore its shape and resist malformation/deformation under the moderate stresses and strains typically encountered by a wearable electronic device.

Details of the components contained within the housings (i.e., within the inner volumes of the housings) of pod structures 101, 102, 103, 104, 105, 106, 107, and 108 are not visible in FIG. 1. To facilitate descriptions of exemplary device 100, some internal components are depicted by dashed lines in FIG. 1 to indicate that these components are contained in the inner volume(s) of housings and may not normally be actually visible in the view depicted in FIG. 1, unless a transparent or translucent material is employed to form the housings. For example, any or all of pod structures 101, 102, 103, 104, 105, 106, 107, and/or 108 may include circuitry (i.e., electrical and/or electronic circuitry). In FIG. 1, a first pod structure 101 is shown containing circuitry 111 (i.e., circuitry 111 is contained in the inner volume of the housing of pod structure 101), a second pod structure 102 is shown containing circuitry 112, and a third pod structure 108 is shown containing circuitry 118. The circuitry in any or all pod structures may be communicatively coupled to the circuitry in at least one other pod structure by at least one communicative pathway (e.g., by at least one electrically conductive pathway and/or by at least one optical pathway). For example, FIG. 1 shows a first set of communicative pathways 121 providing communicative coupling between circuitry 118 of pod structure 108 and circuitry 111 of pod structure 101, and a second set of communicative pathways 122 providing communicative coupling between circuitry 111 of pod structure 101 and circuitry 112 of pod structure 102. Communicative coupling between circuitries of different pod structures in device 100 may advantageously include systems, articles, and methods for stretchable printed circuit boards as described in U.S. Provisional Patent Application Ser. No. 61/872,569 (now U.S. Non-Provisional patent application Ser. No. 14/471,982), systems, articles, and methods for signal routing as described in U.S. Provisional Patent Application Ser. No. 61/866,960 (now U.S. Non-Provisional patent application Ser. No. 14/461,044), and/or systems, articles, and methods for strain mitigation as described in U.S. Provisional Patent Application Ser. No. 61/857,105 (now U.S. Non-Provisional patent application Ser. No. 14/335,668), all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Each individual pod structure within a wearable EMG device may perform a particular function, or particular functions. For example, in device 100, each of pod structures 101, 102, 103, 104, 105, 106, and 107 includes a respective EMG sensor 110 (only one called out in FIG. 1 to reduce clutter) responsive to (i.e., to detect and provide at least one signal in response to) muscle activity corresponding to a gesture performed by a user of wearable EMG device 100. Thus, each of pod structures 101, 102, 103, 104, 105, 106, and 107 may be referred to as a respective "sensor pod." Throughout this specification and the appended claims, the term "sensor pod" is used to denote an individual pod structure that includes at least one sensor responsive to muscle activity of a user. Each EMG sensor 110 may be, for example, a respective surface EMG sensor, such as the differential capacitive EMG sensors described in U.S. Provisional Patent Application Ser. No. 61/771,500 (now U.S. Non-Provisional patent application Ser. No. 14/194,252) and/or the capacitive EMG sensors with resistive electrodes described in U.S. Provisional Patent Application Ser. No. 61/909,786 (now U.S. Non-Provisional patent application Ser. No. 14/553,657).

Pod structure 108 of device 100 includes a processor 130 that processes the signals provided by the EMG sensors 110 of sensor pods 101, 102, 103, 104, 105, 106, and 107 in response to detected muscle activity. Pod structure 108 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. Implementations that employ a digital processor (e.g., a digital microprocessor or microcontroller, a DSP) may advantageously include a non-transitory processor-readable storage medium or memory communicatively coupled thereto and storing processor-executable instructions that control the operations thereof, whereas implementations that employ an ASIC, FPGA, or analog processor may or may not include a non-transitory processor-readable storage medium.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 100, processor pod 108 includes an EMG sensor 110 (not visible in FIG. 1) to sense, measure, transduce or otherwise detect muscle activity of a user, so processor pod 108 could be referred to as a sensor pod. However, in exemplary device 100, processor pod 108 is the only pod structure that includes a processor 130, thus processor pod 108 is the only pod structure in exemplary device 100 that can be referred to as a processor pod. The processor 130 in processor pod 108 also processes the EMG signals provided by the EMG sensor 110 of processor pod 108. In alternative embodiments of device 100, multiple pod structures may include processors, and thus multiple pod structures may serve as processor pods. Similarly, some pod structures may not include sensors, and/or some sensors and/or processors may be laid out in other configurations that do not involve pod structures.

In device 100, processor 130 includes and/or is communicatively coupled to a non-transitory processor-readable storage medium or memory 140. As will be described in more detail later, memory 140 may store processor-executable gesture identification instructions 141 that, when executed by processor 130, cause processor 130 to process the EMG signals from EMG sensors 110 and identify a gesture to which the EMG signals correspond. For communicating with a separate electronic device (not shown), wearable EMG device 100 includes at least one communication terminal. Throughout this specification and the appended claims, the term "communication terminal" is generally used to refer to any physical structure that provides a telecommunications link through which a data signal may enter and/or leave a device. A communication terminal represents the end (or "terminus") of communicative signal transfer within a device and the beginning of communicative signal transfer to/from an external device (or external devices). As examples, device 100 includes a first communication terminal 151 and a second communication terminal 152. First communication terminal 151 includes a wireless transmitter (i.e., a wireless communication terminal) and second communication terminal 152 includes a tethered connector port 152. Wireless transmitter 151 may include, for example, a Bluetooth® transmitter (or similar) and connector port 152 may include a Universal Serial Bus port, a mini-Universal Serial Bus port, a micro-Universal Serial Bus port, a SMA port, a THUNDERBOLT® port, or the like.

For some applications, device 100 may also include at least one inertial sensor 160 (e.g., an inertial measurement unit, or "IMU," that includes at least one accelerometer and/or at least one gyroscope) responsive to (i.e., to detect, sense, or measure) motion effected by a user and to provide signals in response to the detected motion. As will be described in more detail later, signals provided by inertial sensor 160 may be combined or otherwise processed in conjunction with signals provided by EMG sensors 110.

Throughout this specification and the appended claims, the term "provide" and variants such as "provided" and "providing" are frequently used in the context of signals. For example, an EMG sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a surface EMG sensor may include at least one electrode that resistively or capacitively couples to electrical signals from muscle activity. This coupling induces a change in a charge or electrical potential of the at least one electrode which is then relayed through the sensor circuitry and output, or "provided," by the sensor. Thus, the surface EMG sensor may "provide" an electrical signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

As previously described, each of pod structures 101, 102, 103, 104, 105, 106, 107, and 108 may include circuitry (i.e., electrical and/or electronic circuitry). FIG. 1 depicts circuitry 111 inside the inner volume of sensor pod 101, circuitry 112 inside the inner volume of sensor pod 102, and circuitry 118 inside the inner volume of processor pod 118. The circuitry in any or all of pod structures 101, 102, 103, 104, 105, 106, 107 and 108 (including circuitries 111, 112, and 118) may include any or all of: an amplification circuit to amplify electrical signals provided by at least one EMG sensor 110, a filtering circuit to remove unwanted signal frequencies from the signals provided by at least one EMG sensor 110, and/or an analog-to-digital conversion circuit to convert analog signals into digital signals. Device 100 may also include at least one battery (not shown in FIG. 1) to provide a portable power source for device 100.

Signals that are provided by EMG sensors 110 in device 100 are routed to processor pod 108 for processing by processor 130. To this end, device 100 employs a set of communicative pathways (e.g., 121 and 122) to route the signals that are output by sensor pods 101, 102, 103, 104, 105, 106, and 107 to processor pod 108. Each respective pod structure 101, 102, 103, 104, 105, 106, 107, and 108 in device 100 is communicatively coupled to, over, or through at least one of the two other pod structures between which the respective pod structure is positioned by at least one respective communicative pathway from the set of communicative pathways. Each communicative pathway (e.g., 121 and 122) may be realized in any communicative form, including but not limited to: electrically conductive wires or cables, ribbon cables, fiber-optic cables, optical/photonic waveguides, electrically conductive traces carried by a rigid printed circuit board, electrically conductive traces carried by a flexible printed circuit board, and/or electrically conductive traces carried by a stretchable printed circuit board.

Device 100 from FIG. 1 represents an example of a wearable EMG device that incorporates the teachings of the present systems, articles, and methods, though the teachings of the present systems, articles, and methods are applicable to any wearable EMG device that includes at least one EMG sensor. In most applications, it is advantageous for the wearable EMG device to include an on-board processor for performing gesture identification as described herein, but a person of skill in the art will appreciate that at least some of the acts involved in gesture identification described herein may be performed by a processor that is separate from the wearable EMG device (e.g., a processor in a computer that receives signals from the wearable EMG device).

Throughout the descriptions of the systems, articles, and methods that follow, reference is often made to the elements of system 100 from FIG. 1. A person of skill in the art will appreciate that the elements of system 100 are cited in relation to various systems, articles, and methods as illustrative examples only and that the various embodiments described herein may differ from the exemplary embodiment illustrated in FIG. 1. The scope of the present systems, articles, and methods should be construed based on the appended claims. For this reason, throughout the remainder of this description references to elements of system 100 from FIG. 1 are placed in parentheses to indicate that such references are non-limiting and used for illustrative purposes only.

The present systems, articles, and methods describe wearable EMG devices (e.g., 100) that perform automated gesture identification in real-time without invoking computationally intensive calculations that would demand a fast on-board processor and associated support infrastructure. The techniques for gesture identification described herein are specifically designed to be executed by a low-power, low-memory on-board processor in order to simplify the on-board gesture identification system(s) and/or sub-system(s) (e.g., processor 130, memory 140, and processor-executable gesture identification instructions 141), their associated footprint(s) in the wearable EMG device (e.g., 100), and their associated resource demands.

Throughout this specification and the appended claims, the term "real-time" as in "gesture identification in real-time" is used to describe a data processing procedure that is executed and completed without any substantially perceivable delay. In the case of gesture identification in real-time, the term "real-time" is used to indicate that the gesture identification procedure is executed and completed without the user perceiving any substantial delay between performing the gesture and receiving feedback that the gesture has been identified. The nature of the feedback depends on the specific application, and may include, for example, execution of a function or operation in response to the user-performed gesture. Feedback is generally desirable, but some applications may not provide the user with feedback when a gesture is identified. In general, a user is expected to clearly perceive a delay if it's duration exceeds about two seconds and it is advantageous for "gesture identification in real-time" to be executed and completed within one second of the user performing a gesture. Preferably, gesture identification in real-time is completed within a few hundred milliseconds.

The wearable EMG devices (e.g., 100) described herein include a non-transitory processor-readable storage medium (e.g., 140) that stores processor-executable gesture identification instructions (e.g., 141) that, when executed by the processor (e.g., 130) of the wearable EMG device (e.g., 100), cause the processor (e.g., 130) of the wearable EMG device (e.g., 100) to identify user-performed gestures using generalized algorithms that are substantially robust against variations in the specific use parameters (such as the form of the user, the orientation of the wearable EMG device, and/or environmental conditions).

Figure 2:
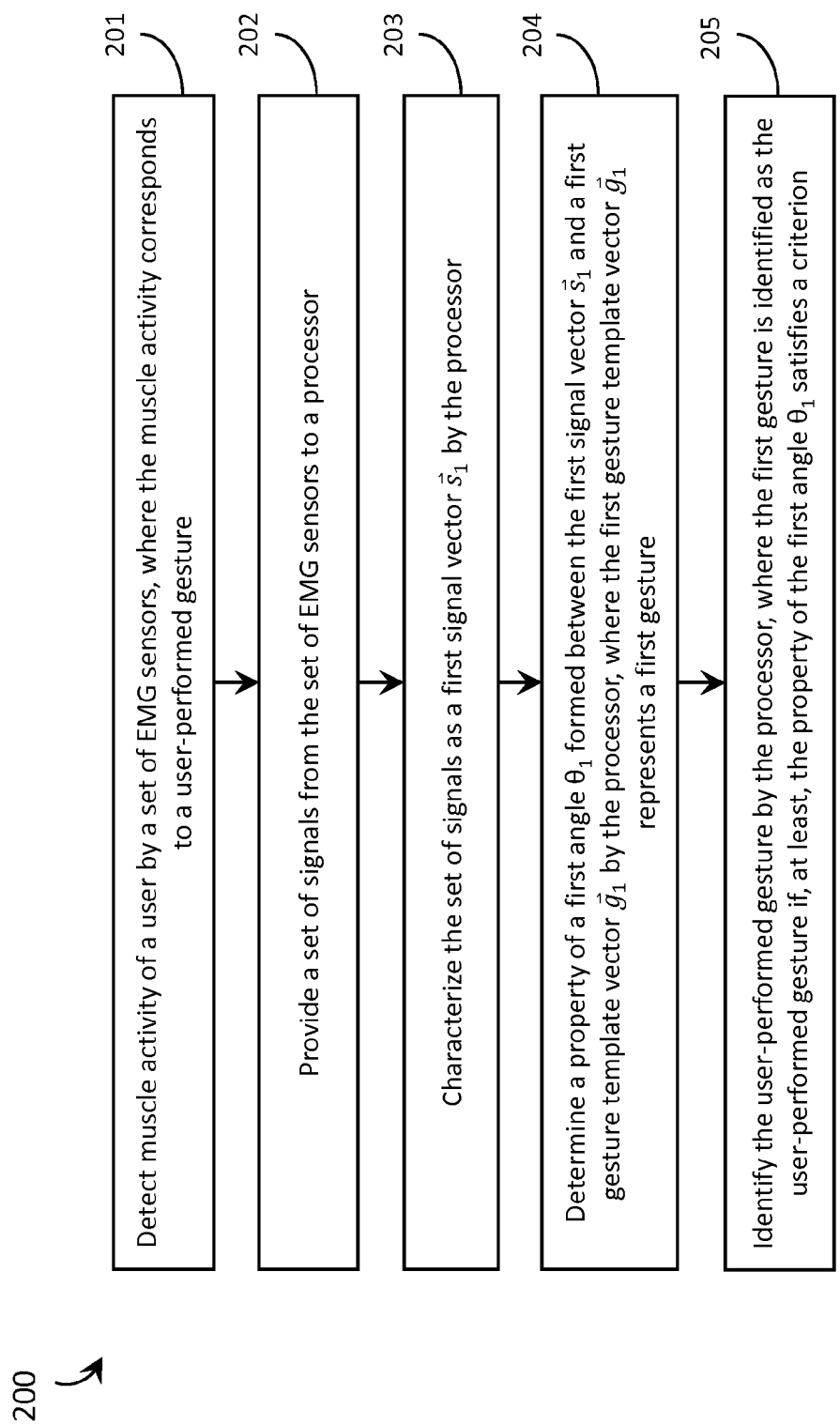
FIG. 2 is a flow-diagram showing a method of operating a wearable EMG device in accordance with the present systems, articles, and methods.

FIG. 2 is a flow-diagram showing a method 200 of operating a wearable EMG device (100) in accordance with the present systems, articles, and methods. More specifically, method 200 is a method of identifying a gesture performed by (e.g., identifying which gesture in a gesture library is performed by) a user of a wearable EMG device. The wearable EMG device (100) includes a set of EMG sensors (110) and a processor (130) and may form part of a human-electronics interface in which the wearable EMG device (100) is used to provide gesture-based interaction with and/or control of an electronic device.

Throughout this specification and the appended claims, "identifying" a gesture means associating a set of signals provided by one or more EMG sensor(s) (110) with a particular gesture (e.g., from a gesture library). In the various embodiments described herein, "identifying" a gesture includes determining which gesture in a gesture library is most probable (relative to the other gestures in the gesture library, and relative to a "confidence" threshold/criterion if applicable) of being the gesture that a user has performed or is performing in order to produce the EMG signals upon which the gesture identification is at least partially based. Throughout this specification and the appended claims, the term "gesture library" is used to generally describe a set of gestures that a wearable EMG device (100) is operative to identify. The wearable EMG devices described herein are generally not operative to identify any arbitrary gesture performed by a user. Rather, the wearable EMG devices described herein are operative to identify when a user performs one of a specified set of gestures, and that specified set of gestures is referred to herein as a gesture library. A gesture library may include any number of gestures, though a person of skill in the art will appreciate that the precision/accuracy of gesture identification may be inversely related to the number of gestures in the gesture library. A gesture library may be expanded by adding one or more gesture(s) or reduced by removing one or more gesture(s). Furthermore, in accordance with the present systems, articles, and methods, a gesture library may include a "rest" gesture corresponding to a state for which no activity is detected and/or an "unknown" gesture corresponding to a state for which activity is detected but the activity does not correspond to any other gesture in the gesture library.

Method 200 includes five acts 201, 202, 203, 204, and 205, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 200, the term "user" refers to a person that is wearing the wearable EMG device (100).

At 201, a set of EMG sensors (110) of a wearable EMG device (100) detect muscle activity of a user. The muscle activity corresponds to a user-performed gesture (i.e., a physical gesture that is performed by the user). As an example, the wearable EMG device (100) may be worn on an arm of the user and the physical gesture may include a hand gesture such as a finger extension, a pinching gesture, a finger snap, a clenched fist, etc. As previously described, the EMG sensors (110) may include, for example, surface EMG sensors that detect electrical signals generated by the user's muscle activity through capacitive or resistive coupling thereto.

At 202, the set of EMG sensors (110) provide a set of signals to the processor (130) of the wearable EMG device (100) in response to the detected muscle activity of act 201. The signals may be, for example, electrical or optical signals routed from the EMG sensors (110) to the processor (130) through electrically conductive or optical communicative pathways (121, 122). Providing a set of signals from the set of EMG sensors (110) to the processor (130) may include providing a respective signal from each respective EMG sensor (110) in the set of EMG sensors to the processor (130). For example, each EMG sensor (110) in the set of EMG sensors may communicatively couple to the processor (130) using one or more signal channel(s) (121, 122) to provide either analog or digital signals to the processor (130). In the case of providing analog signals from each EMG sensor (110) in the set of EMG sensors to the processor (130), a respective signal channel (121, 122) in the form of a respective physical communicative link (e.g., a respective signal line formed of one or more wires and/or one or more electrically conductive traces, etc.) may communicatively couple from each EMG sensor (110) to the processor (130). In the case of providing digital signals from each EMG sensor (110) in the set of EMG sensors to the processor (130), each EMG sensor (110) may be allocated a respective effective signal channel in the form of, for example, a dedicated bit assignment (i.e., an allocation of bits in specific positions of a bit string), a dedicated signal or time window (i.e., with reference to a clock signal), etc. Further details of systems, articles, and methods for signal routing in wearable EMG devices are described in, for example, U.S. Provisional Patent Application Ser. No. 61/866,960 (now U.S. Non-Provisional patent application Ser. No. 14/461,044).

At 203, the processor (130) of the wearable EMG device (100) characterizes the set of signals provided at act 202 as a first signal vector $\vec{s}_1$. More generally, at least respective portions of at least some of the signals in the set of signals provided at act 202 are characterized as a first signal vector $\vec{s}_1$ by the processor (130) of the wearable EMG device (100). Unless the specific context requires otherwise, throughout this specification and the appended claims reference to a "signal" should be understood to mean "at least a portion of the signal."

Characterizing the set of signals as a first signal vector $\vec{s}_1$ by the processor (130) may include determining at least one feature of at least a respective portion of each signal in the set of signals by the processor (130) such that the first signal vector $\vec{s}_1$ is defined in a multi-dimensional space. The set of features may include characteristics, parameters, magnitudes, or generally any property or properties of the signals in the set of signals in, for example, the time, frequency, and/or time-frequency domains. For each signal, the feature(s) that is/are determined by the processor (130) may include, without limitation: an average value of the signal, a mean value of the signal, a median value of the signal, a mode value of the signal, a maximum value of the signal, a minimum value of the signal, a standard deviation of the signal, a mean power frequency of the signal, and/or a root mean square ("RMS") value of the signal. The characterization of the first signal vector $\vec{s}_1$ per act 203 may make use of the same type of feature or signal characteristic (e.g., magnitude, voltage, potential, amperage, state, direction, etc.) for each signal in the set of signals, or may include different types of features or signal characteristics for different signals in the set of signals, or may include different types of features or signal characteristics for the same signal in the set of signals. The characterization of the first signal vector $\vec{s}_1$ per act 203 may make use of the features themselves, or may make use of relationships between the features, such as respective differences between pairs of features, respective ratios of at least two features, and/or respective correlations between pairs of features. Relationships (e.g., differences, ratios, and/or correlations) between features may be determined by the processor (130) of the wearable EMG device (100).

Figure 3:
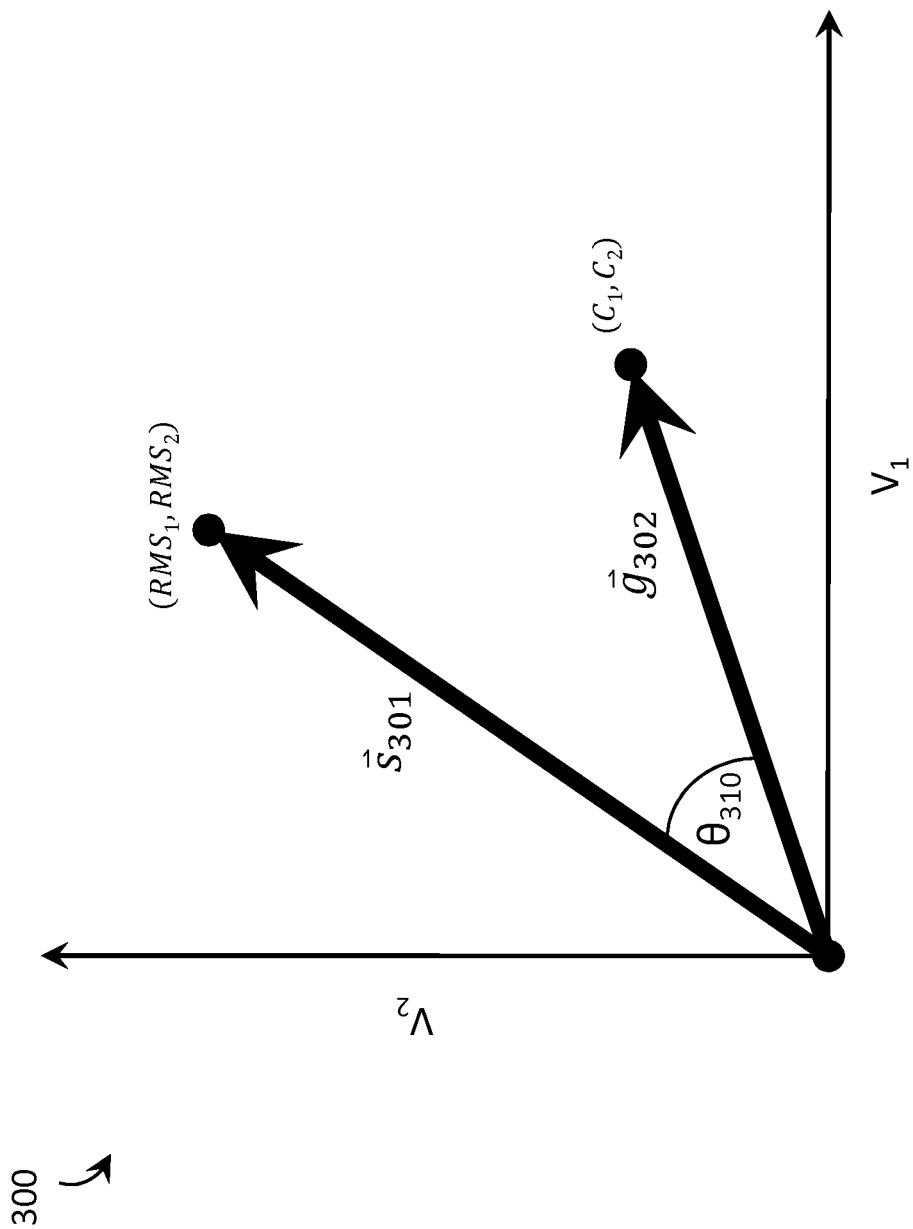
FIG. 3 is an illustrative diagram of a multi-dimensional space that includes an exemplary signal vector $\vec{s}$, an exemplary gesture template vector $\vec{g}$, and an exemplary angle $\theta$ therebetween in accordance with the present systems, articles, and methods.

Throughout this specification and the appended claims, the term "signal vector" and the symbol "$\vec{s}$" are generally used to denote a set of signal data that may be construed as a vector in a multi-dimensional space, where each dimension of the multi-dimensional space corresponds to a respective parameter, characteristic, or feature of at least one signal from the set of signals. For example, a wearable EMG device (100) that employs a set of eight EMG sensors (110) may characterize a signal vector $\vec{s}$ in an eight-dimensional space, where each dimension of the eight-dimensional space represents the magnitude (e.g., voltage) of the signal provided by a respective one of the eight EMG sensors (110) in the device (100) and the signal vector $\vec{s}$ is characterized by the respective $RMS_1$ values of the voltages provided by the eight EMG sensors (110). In the present systems, articles, and methods "characterizing a set of signals as a signal vector" may or may not include actually plotting the signal vector in the corresponding multi-dimensional space. As discussed in more detail later on, "characterizing a set of signals as a signal vector" generally means defining a signal vector $\vec{s}$ that is characterized by the set of signals (e.g., by features of the set of signals) as may be done by, for example, defining the elements of the signal vector (such as $\vec{s} = [RMS_1, RMS_2, \ldots, RMS_8]$ for the respective RMS values of eight EMG sensors), by defining a magnitude and/or direction of the signal vector, and so on. Further details of an exemplary signal vector $\vec{s}$ are illustrated in FIG. 3 and described later on.

As previously described, the wearable EMG device (100) may include a non-transitory processor-readable storage medium or memory (140) that is communicatively coupled to the processor (130), where the memory (140) stores processor-executable gesture identification instructions (141) that, when executed by the processor (130), cause the processor (130) to characterize the set of signals as a first signal vector $\vec{s}_1$ per act 203 of method 200.

At 204, the processor (130) determines a property of a first angle $\theta_1$ formed between the first signal vector $\vec{s}_1$ and a first gesture template vector $\vec{g}_1$, where the first gesture template vector $\vec{g}_1$ represents a first gesture. The property may include, for example, a magnitude of the first angle $\theta_1$ or a value of a trigonometric function applied to the first angle $\theta_1$, such as a cosine of the first angle $\theta_1$ (i.e., $\cos \theta_1$) or a sine of the first angle $\theta_1$ (i.e., $\sin \theta_1$).

Throughout this specification and the appended claims, the term "gesture template vector" and the symbol "$\vec{g}$" are generally used to denote a set of stored data that represent a gesture (e.g., a feature template for the gesture). The gesture template vector $\vec{g}$ representation of a gesture may be construed as a vector in a multi-dimensional space, where each dimension of the multi-dimensional space corresponds to a respective parameter, characteristic, or feature of the gesture. A wearable EMG device (100) may store multiple gesture template vectors $\vec{g}_i$ as a library of gesture template vectors G, where each gesture template vector $\vec{g}_i$ in the library of gesture template vectors G represents a respective gesture from the library of gestures that the wearable EMG device (100) is operative to identify. Each gesture template vector $\vec{g}$ in the library of gesture template vectors G may be stored and defined in the wearable EMG device (100) (e.g., in a non-transitory processor-readable storage medium 140 of the wearable EMG device 100) in various forms, including without limitation: as a respective set of gesture template vector elements (such as $\vec{g} = [RMS_1, RMS_2, \ldots, RMS_8]$ for the respective RMS values of eight EMG sensors), as a magnitude and/or direction of the gesture template vector, and so on. Further details of an exemplary gesture template vector $\vec{g}$ and an angle $\theta$ formed between a signal vector $\vec{s}$ and a gesture template vector $\vec{g}$ are illustrated in FIG. 3 and described later on.

As previously described, the wearable EMG device (100) may include a non-transitory processor-readable storage medium or memory (140) that is communicatively coupled to the processor (130), where the memory (140) stores processor-executable gesture identification instructions (141) that, when executed by the processor (130), cause the processor to determine a property of a first angle $\theta_1$ formed between the first signal vector $\vec{s}_1$ and a first gesture template vector $\vec{g}_1$ per act 204 of method 200.

At 205, the processor (130) of the wearable EMG device (100) identifies the user-performed gesture. For example, the processor (130) may identify the first gesture represented by the first gesture template vector $\vec{g}_1$ of act 204 as the user-performed gesture at act 205 if, at least, the property of the first angle $\theta_1$ determined at act 204 satisfies a criterion. The criterion may include a threshold value and method 200 may include evaluating the property of the first angle $\theta_1$ against the threshold value. In this case, the property of the first angle $\theta_1$ may satisfy the criterion if the property is less than or greater than the threshold value, depending on the nature of the property. For example, if the property of the first angle $\theta_1$ determined at act 204 is a magnitude of the first angle $\theta_1$ or a sine of the first angle, $\sin \theta_1$, then the property may satisfy the criterion if the property is less than a threshold value, indicating a measure of similarity between the direction of the first signal vector $\vec{s}_1$ and the direction of the first gesture template vector $\vec{g}_1$. On the other hand, if the property of the first angle $\theta_1$ determined at act 204 is a cosine of the first angle, $\cos \theta_1$, then the property may satisfy the criterion if the property is greater than a threshold value, likewise indicating a measure of similarity between the direction of the first signal vector $\vec{s}_1$ and the direction of the first gesture template vector $\vec{g}_1$.

As previously described, the wearable EMG device (100) may include a non-transitory processor-readable storage medium or memory (140) that is communicatively coupled to the processor (130), where the memory (140) stores processor-executable gesture identification instructions (141) that, when executed by the processor (130), cause the processor to identify the user-performed gesture per act 205 of method 200.

As described previously, the wearable EMG device (100) may include at least one inertial sensor (160), such as an MPU-9150 Nine-Axis MEMS MotionTracking™ Device from InvenSense. In this case, method 200 may be extended to include: detecting motion of the wearable EMG device (100) by the at least one inertial sensor (160), where the motion corresponds to the user-performed gesture; in response to detecting motion of the wearable EMG device (100) by the at least one inertial sensor (160), providing at least one signal from the at least one inertial sensor (160) to the processor (130); and processing the at least one signal from the at least one inertial sensor (160) by the processor (130). Furthermore, identifying the user-performed gesture by the processor (130) per act 205 may further include identifying the user-performed gesture by the processor (130) based at least in part on an outcome of the processing the at least one signal from the at least one inertial sensor (160) by the processor (130). For example, an outcome of processing the at least one signal from the at least one inertial sensor (160) may be processed separately from the first angle $\theta_1$ determined at act 204 and the first gesture may be identified as the user-performed gesture if both: i) the property of the first angle $\theta_1$ satisfies a first criterion and ii) the outcome of processing the at least one signal from the at least one inertial sensor (160) satisfies a second criterion. Alternatively, the first signal vector $\vec{s}_1$ characterized at act 203 may include at least one dimension allocated to an outcome of processing the at least one signal from the at least one inertial sensor (160) such that the property of the first angle $\theta_1$ determined at act 204 is based, in part, on an outcome of processing the at least one signal from the at least one inertial sensor (160).

At act 205, the first gesture may be identified as the user-performed gesture if the property of the first angle $\theta_1$ satisfies a criterion. If the property of the first angle $\theta_1$ does not satisfy the criterion, then method 200 may include determining a property of a second angle $\theta_2$ formed between the first signal vector $\vec{s}_1$ and a second gesture template vector $\vec{g}_2$ by the processor (130), where the second gesture template vector $\vec{g}_2$ represents a second gesture. In this case, identifying the user-performed gesture by the processor (130) per act 205 may include identifying the second gesture as the user-performed gesture by the processor (130) if, at least, the property of the second angle $\theta_2$ satisfies the criterion. Similarly, if the property of the second angle $\theta_2$ does not satisfy the criterion, then method 200 may include, until an angle $\theta^*$ having a property that does satisfy the criterion is identified, iteratively: determining a property of an angle $\theta_i$ formed between the first signal vector $\vec{s}_1$ and an $i^{th}$ gesture template vector $\vec{g}_i$ by the processor (130), where $i>2$ and the $i^{th}$ gesture template vector $\vec{g}_i$ represents an $i^{th}$ gesture. In response to identifying an angle $\theta^*$ having a property that satisfies the criterion, identifying the user-performed gesture by the processor (130) per act 205 may include: stopping the iteration; and identifying, by the processor (130), the gesture that is represented by the gesture template vector $\vec{g}^*$ corresponding to the angle $\theta^*$ that satisfies the criterion as the user-performed gesture.

Method 200 may generally be carried out in several different ways. As described above, method 200 may include sequentially determining, by the processor (130), a property of the respective angle $\theta_i$ formed between the first signal vector $\vec{s}_1$ and each respective $i^{th}$ gesture template vector $\vec{g}_i$ in the library of gesture template vectors G; evaluating the property of the angle $\theta_i$ against a criterion by the processor (130); and, once an angle $\theta^*$ having a property that satisfies the criterion is found, identifying, as the user-performed gesture, the gesture represented by the gesture template vector $\vec{g}^*$ that corresponds to the angle $\theta^*$. In this approach, the individual gesture template vectors $\vec{g}_i$ in the library of gesture template vectors G are sequentially compared to the first signal vector one by one until a gesture template vector $\vec{g}^*$ having a direction that sufficiently matches that of the first signal vector $\vec{s}_1$ is found, and then the gesture template vector $\vec{g}^*$ having a direction that sufficiently matches that of the first signal vector $\vec{s}_1$ is identified as the user-performed gesture without necessarily evaluating all of the gesture template vectors $\vec{g}_i$ in the library of gesture template vectors G. As an alternative to this approach, each gesture template vector $\vec{g}_i$ in the library of gesture template vectors G may be compared to the first signal vector $\vec{s}_1$ (by determining a property of the corresponding angle $\theta_i$) and the gesture represented by the gesture template vector $\vec{g}^*$ having an angle $\theta^*$ that best satisfies the criterion may be identified as the user-performed gesture. For example, method 200 may include, for each gesture template vector $\vec{g}_i$ in a library of gesture template vectors G, each gesture template vector $\vec{g}_i$ representing a respective gesture, determining a property of an angle $\theta_i$ formed between the first signal vector $\vec{s}_1$ and the gesture template vector $\vec{g}_i$ by the processor (130), which necessarily includes determining a property of a first angle $\theta_1$ formed between the first signal vector $\vec{s}_1$ and a first gesture template vector $\vec{g}_1$ by the processor (130) per act 204. Thus, identifying the user-performed gesture by the processor (130) per act 205 includes identifying, by the processor (130), a gesture represented by a gesture template vector $\vec{g}_i$ from the library of gesture template vectors G for which the property of the angle $\theta_i$ satisfies a criterion, which includes identifying the first gesture as the user-performed gesture by the processor if, at least: i) the property of the first angle $\theta_1$ satisfies the criterion (per act 205) and ii) the property of the first angle $\theta_1$ better satisfies the criterion than the property of any other angle $\theta_i$. In situations where two or more angles $\theta_i$ satisfy the criterion, the angle $\theta^*$ that better satisfies the criterion (i.e., the angle $\theta^*$ that best satisfies the criterion) may be the angle having the greatest property (if, for example, the property is a cosine of the angle, cos $\theta^*$) or the angle having the smallest property (if, for example, the property is a magnitude or sine of the angle, sin $\theta^*$), depending on the nature of the property.

The various embodiments described herein provide systems, articles, and methods for performing automated gesture identification in real-time based, at least in part, on EMG signal data. As exemplified in method 200, the techniques described herein employ the concepts of a multi-dimensional space, a signal vector $\vec{s}$, a gesture template vector $\vec{g}$, and an angle $\theta$ formed therebetween.

FIG. 3 is an illustrative diagram of a multi-dimensional space 300 that includes an exemplary signal vector $\vec{s}_{301}$, an exemplary gesture template vector $\vec{g}_{302}$, and an exemplary angle $\theta_{310}$ therebetween in accordance with the present systems, articles, and methods. Exemplary multi-dimensional space 300 is a two-dimensional space defined by respective signals (i.e., voltages, $V_1$ and $V_2$) provided by two EMG sensors (110) of a wearable EMG device (100), though in general the techniques described herein may be employed using a multi-dimensional space having any number N of dimensions (i.e., an N-dimensional space), where N≥2. For example, since wearable EMG device 100 from FIG. 1 has eight EMG sensors 110, wearable EMG device 100 may employ an eight-dimensional space when implementing the various methods described herein (e.g., method 200). FIG. 3 depicts a two-dimensional space 300 solely for ease of illustration, as a person of skill in the art will appreciate that illustration of an eight-dimensional space would be unduly complicated.

As previously described, a first signal vector $\vec{s}_1$ characterizes a first set of signal data. Exemplary signal vector $\vec{s}_{301}$ in FIG. 3 characterizes the $RMS_1$ value of an EMG signal (voltage, $V_1$) provided by a first EMG sensor (110) of a wearable EMG device (100) and the $RMS_2$ value of an EMG signal (voltage, $V_2$) provided by a second EMG sensor (110) of the wearable EMG device (100). Exemplary signal vector $\vec{s}_{301}$ has a magnitude $|\vec{s}_{301}|$ and a direction defined by a line that connects the origin of space 300 to the point in space 300 corresponding to ($RMS_1$, $RMS_2$). Exemplary signal vector $\vec{s}_{301}$ corresponds to data that is measured by the wearable EMG device (100) while in use (e.g., while a user performs a physical gesture). Thus, the magnitude $|\vec{g}_{301}|$ and direction of signal vector $\vec{s}_{301}$ depend directly on the EMG signals detected by the EMG sensors (110) of the wearable EMG device (100) and should be different for different user-performed gestures (provided that the different user-performed gestures are sufficiently distinct from one another).

As also previously described, a first gesture template vector $\vec{g}_1$ characterizes a first set of stored data. Exemplary gesture template vector $\vec{g}_{302}$ in FIG. 3 characterizes a set of stored data (e.g., data stored in a non-transitory processor-readable storage medium (140) of the wearable EMG device (100)) that represent a particular gesture that the wearable EMG device (100) is operative to identify. Exemplary gesture template vector $\vec{g}_{302}$ has a magnitude $|\vec{g}_{302}|$ and a direction defined by a line that connects the origin of space 300 to the point in space corresponding to ($C_1$, $C_2$). Exemplary gesture template vector $\vec{g}_{302}$ corresponds to data that is stored in the wearable EMG device (100) and characterizes what at least the direction of the signal vector $\vec{s}$ is expected to approximately resemble when a user performs the particular gesture represented by exemplary gesture template vector $\vec{g}_{302}$. In other words, exemplary gesture template vector $\vec{g}_{302}$ provides a template for at least the directional aspect of the expected EMG signal profile corresponding to a particular gesture against which exemplary signal vector $\vec{s}_{301}$ may be compared to determine (based on a measure of similarity characterized by the angle $\theta_{310}$) whether or not the gesture represented by exemplary gesture template vector $\vec{g}_{302}$ is the user-performed gesture.

The point ($C_1$, $C_2$) that, together with the origin of space 300, defines exemplary gesture template vector $\vec{g}_{302}$ may be determined in a variety of different ways. For example, when the user first dons the wearable EMG device (100), the user may be prompted to perform one or more trial(s) of each gesture in the gesture library. When the user performs one trial of a given gesture, the wearable EMG device (100) may detect the resulting EMG signal(s) (and/or IMU signals), calculate the corresponding RMS value(s), and store (e.g., in an on-board memory (140)) the result as a point (e.g., ($C_1$, $C_2$)) in the multi-dimensional space that characterizes a gesture template vector $\vec{g}$ that is representative of that gesture. If the user performs multiple trials of a given gesture, the results of multiple trials may be combined (e.g., averaged) to determine, for example, their centroid and the centroid may be stored as the point (e.g., ($C_1$, $C_2$)) in the multi-dimensional space that characterizes the gesture template vector corresponding to that gesture. Alternatively, the wearable EMG device (100) may come already pre-loaded with a library G of gesture template vectors stored in the memory (140) thereof, such that the user is not required to perform any trials of the gestures in the gesture library. In this case, each gesture template vector $\vec{g}_i$ in the library of gesture template vectors G may be characterized by a respective point (e.g., ($C_1$, $C_2$)) in a multi-dimensional space, where each point is a respective centroid or other form of average of multiple points in the multi-dimensional space, the multiple points each corresponding to respective trials of a gesture performed by any number (e.g., one, tens, hundreds, thousands) of users. For example, in a training phase, multiple different users (e.g., tens, hundreds, thousands of different users) may perform one or more trial(s) of each gesture in a gesture library and the corresponding EMG signals may be recorded. For each trial of each gesture performed by each user, RMS value(s) of the corresponding signals may be determined and used to define a point in a multi-dimensional space. The collection of points in the multi-dimensional space that all represent the same gesture (e.g., over multiple trials and/or over multiple users) may be averaged to determine, for example, the centroid and this centroid (e.g., ($C_1$, $C_2$)) may be used to characterize the gesture template vector $\vec{g}$ that represents that gesture. The collection of resulting centroids may be stored in the memory (140) of the wearable EMG device (100) to define a library G of gesture template vectors $\vec{g}_i$.

As previously described, a first angle $\theta_1$ may be formed between a first signal vector $\vec{s}_1$ and a first gesture template vector $\vec{g}_1$. In space 300 of FIG. 3, an exemplary angle $\theta_{310}$ is formed between exemplary signal vector $\theta_{301}$ and exemplary gesture template vector $\vec{g}_{302}$. Exemplary angle $\theta_{310}$ characterizes a measure of similarity between the direction of exemplary signal vector $\vec{s}_{301}$ and the direction of exemplary gesture template vector $\vec{g}_{302}$. For example, if the direction of exemplary signal vector $\vec{s}_{301}$ is exactly the same as the direction of exemplary gesture template vector $\vec{g}_{302}$, then the magnitude of exemplary angle $\theta_{310}$ will be zero; however, if the direction of exemplary signal vector $\vec{s}_{301}$ is not exactly the same as the direction of exemplary gesture template vector $\vec{g}_{302}$, then the magnitude of exemplary angle $\theta_{310}$ will be non-zero. The larger the divergence between the direction of exemplary signal vector $\vec{g}_{301}$ and the direction of exemplary gesture template vector $\vec{g}_{302}$, the larger the magnitude of exemplary angle $\theta_{310}$. In accordance with the present systems, articles, and methods, using the relative directions of gesture template vectors $\vec{g}_i$ and a signal vector $\vec{s}$ (more specifically, using a property of the angle $\theta_i$ formed therebetween) as a measure of the similarity between data representative of gestures in a gesture library and data collected in response to a user-performed gesture for the purpose of automated real-time gesture identification provides enhanced robustness against variations in use parameters compared to, for example, using signal magnitudes for this purpose. For example, two users performing the same gesture may produce respective signal vectors $\vec{s}$ of very different magnitudes $|\vec{s}|$ (due to, e.g., variations in muscle density, strength, hair density, skin moisture) but of relatively similar direction. The present systems, articles, and methods describe gesture identification techniques that compare the directions of vector representations of gesture data as opposed to, for example, the magnitudes thereof and thereby achieve enhanced accuracy and robustness across different users. However, in accordance with the present systems, articles, and methods, magnitude information may still be used, for example, to indicate a quality of a gesture (such as a force or power of the gesture). For example, in an HCI in which a first gesture is used to control the braking of a vehicle (either in reality or in simulation, such as in a video game), the identification that a first is performed by the user may trigger a braking mechanism while the force with which the user clenches the first may control the force of the braking action. In this example, the first gesture itself may be represented by the direction of the corresponding signal vector $\vec{s}$ (because it substantially matches the direction of a stored gesture template vector $\vec{g}$ that represents the first gesture), while the force of the first gesture may be represented by the magnitude $|\vec{s}|$ of that same signal vector $\vec{s}$.

Throughout this specification and the appended claims, reference is often made to "a property of an angle $\theta$." Non-limiting examples of such a property include a magnitude of the angle, $|\theta|$, or a trigonometric function applied to the angle, such as a cosine of the angle, $\cos\theta$, or a sine of the angle, $\sin\theta$. Since the angle $\theta$ is formed between two vectors, the value of a trigonometric function applied to the angle $\theta$ may be determined without knowing our calculating the magnitude, $|\theta|$, of the angle itself. For example, the cosine of a first angle $\theta_1$ formed between a first signal vector $\vec{s}_1$ and a first gesture template vector $\vec{g}_1$ may be calculated using the dot product of the two vectors as in equation 1 below:

$$\cos\theta_1 = \frac{\vec{s}_1 \cdot \vec{g}_1}{|\vec{s}_1||\vec{g}_1|} \qquad (1)$$

Thus, determining a property of a first angle $\theta_1$ per act 204 of method 200 may include calculating a cosine of the first angle, $\cos\theta_1$, by applying equation 1 using the elements of the first signal vector $\vec{s}_1$ (e.g., $\vec{s}_{301}$=[$RMS_1$, $RMS_2$]) and the elements of the first gesture template vector $\vec{g}_1$ (e.g., $\vec{g}_{302}$=[$C_1$, $C_2$]). Since the cosine of zero degrees is one (i.e., $\cos(0)=1$; the maximum value of the cosine function), $\cos\theta_1$ is maximal when the direction of the first signal vector $\vec{s}_1$ matches the direction of the first gesture template vector $\vec{g}_1$. A larger $\cos\theta_1$ value is indicative of a smaller $\theta_1$ value and a better match between the direction of the first signal vector $\vec{s}_1$ and the direction of the first gesture template vector $\vec{g}_1$. For implementations of method 200 in which act 204 involves determining a cosine of the first angle, $\cos\theta_1$, by applying equation 1, the first gesture may be identified as the user-performed gesture per act 205 if the cosine of the first angle, $\cos\theta_1$, meets or exceeds (i.e., is greater than or equal to) a threshold value. Depending on the degree of accuracy required in the specific application and/or on the number and separability of gestures in the gesture library, the threshold value for the cosine of the first angle, $\cos\theta_1$, may be set at, for example, 0.75, 0.8, 0.9, 0.95, etc. As previously described, in alternative implementations the property of the first angle $\theta_1$ determined at act 204 may include the magnitude, $|\theta_1|$, of the first angle or the sine of the first angle, $\sin\theta_1$, in either of which cases the first gesture may be identified as the user-performed gesture per act 205 if the property of the first angle (i.e., $|\theta_1|$ or $\sin\theta_1$) is less than or equal to a threshold value. The sine of the first angle, $\sin\theta_1$, may be calculated using the cross product of the two vectors and the threshold value for the sine of the first angle, $\sin\theta_1$, may be set at, for example, 0.25, 0.2, 0.1, 0.05, etc.

Method 200 may be implemented, executed, performed, or otherwise carried out by exemplary wearable EMG device 100 from FIG. 1, or more generally by any wearable EMG device that includes: a set of EMG sensors (110) responsive to (i.e., to detect and to provide one or more signal(s) in response to detecting) muscle activity of a user of the wearable EMG device per act 201 and act 202, the muscle activity corresponding to a user-performed gesture; a processor (130) communicatively coupled to the set of EMG sensors (110); and a non-transitory processor-readable storage medium (140) communicatively coupled to the processor (130), the non-transitory processor-readable storage medium (140) storing processor-executable gesture identification instructions (141) that, when executed by the processor (130), cause the processor (130) to: characterize the set of signals as a first signal vector $\vec{s}_1$ per act 203; determine a property of a first angle $\theta_1$ formed between the first signal vector $\vec{s}_1$ and a first gesture template vector $\vec{g}_1$ per act 204, where the first gesture template vector $\vec{g}_1$ represents a first gesture; and identify the user-performed gesture per act 205, where identifying the user-performed gesture includes identifying the first gesture as the user-performed if, at least, the property of the first angle $\theta_1$ satisfies a criterion.

In accordance with the present systems, articles, and methods, information about a gesture library and/or the gestures included therein may be contained, encoded, or otherwise embodied in, for example, a library of gesture template vectors G. Each gesture template vector $\vec{g}_i$ in the library of gesture template vectors $\vec{g}_i$ may be stored in a non-transitory processor-readable storage memory (140) in the form of, for example, a respective set of vector elements $\vec{g}_i = [C_1, C_2, \ldots, C_N]$ which define a respective centroid in an N-dimensional space, or in the form of a direction specification with or without an associated magnitude. Known proposals for automated gesture identification typically involve defining a unique signature or template for the magnitudes of the EMG signals that correspond to each gesture in a gesture library and then matching the magnitudes of a set of incoming EMG signals to one of the defined templates. The matching may involve complicated and/or computationally intensive calculations that invoke techniques from pattern recognition, machine learning, and/or artificial intelligence. Such approaches are highly susceptible to variations in EMG signal magnitudes arising from numerous causes, such as variations in muscle strength across users, variations in skin moisture across users or over time for the same user, and so on. The present systems, articles, and methods achieve enhanced accuracy and robustness over such magnitude-based approaches by matching the direction of a signal vector $\vec{s}$ that is representative of incoming EMG signals to the directions of the gesture template vectors $\vec{g}_i$ in the stored library of gesture template vectors G. Furthermore, the "direction-based" gesture identification techniques described herein are particularly well-suited for use in applications where computational resources are limited, such as in wearable electronic devices. A person of skill in the art will appreciate that simple point and/or direction information for a library of gesture template vectors G may require very little memory for storage and that determining a property of an angle $\theta$ (e.g., by calculating a cosine of the angle, cos $\theta$, using equation 1) may require very little computational power.

A typical user may take on the order of milliseconds to seconds to perform a gesture, and throughout that duration the EMG signals detected and provided at acts 201 and 202, respectively, of method 200 may continuously evolve. If the signal vector $\vec{s}$ characterized at act 203 of method 200 is based on average EMG signal values, such as respective RMS values of each EMG signal channel, then such average values may miss important signal characteristics if they are averaged over the entire duration of the user-performed gesture. In accordance with the present systems, articles, and methods, it can be advantageous to parcel, segment, or otherwise group the time-varying EMG signal from each respective EMG sensor into discrete time windows or "portions" (synchronized across all of the EMG signals) and to determine at least one respective signal vector $\vec{s}_i$ (e.g., based on a respective set of RMS values) for each time portion of the set of EMG signals. In this way, the resulting set of signal vectors $\vec{s}_i$ may capture more gesture-specific characteristics that might otherwise be lost in a longer-term averaging process. The accuracy of the gesture identification techniques described herein may be enhanced by combining the results of multiple analyses across multiple time windows.

As previously described, the set of features that characterize a signal vector $\vec{s}$ may include relationships between features (e.g., ratios, differences, or correlations between features), such as relationships between the respective features of different EMG signals (i.e., signals from different EMG sensors). In applications that include parceling, segmenting, or otherwise grouping the time-varying EMG signal from each respective EMG sensor into discrete time windows, the set of features may include relationships between the respective features of different time windows of the same (or different) EMG signals. In this way, the set of features may characterize how the signal from each EMG sensor (110) changes over time.

Figure 4:
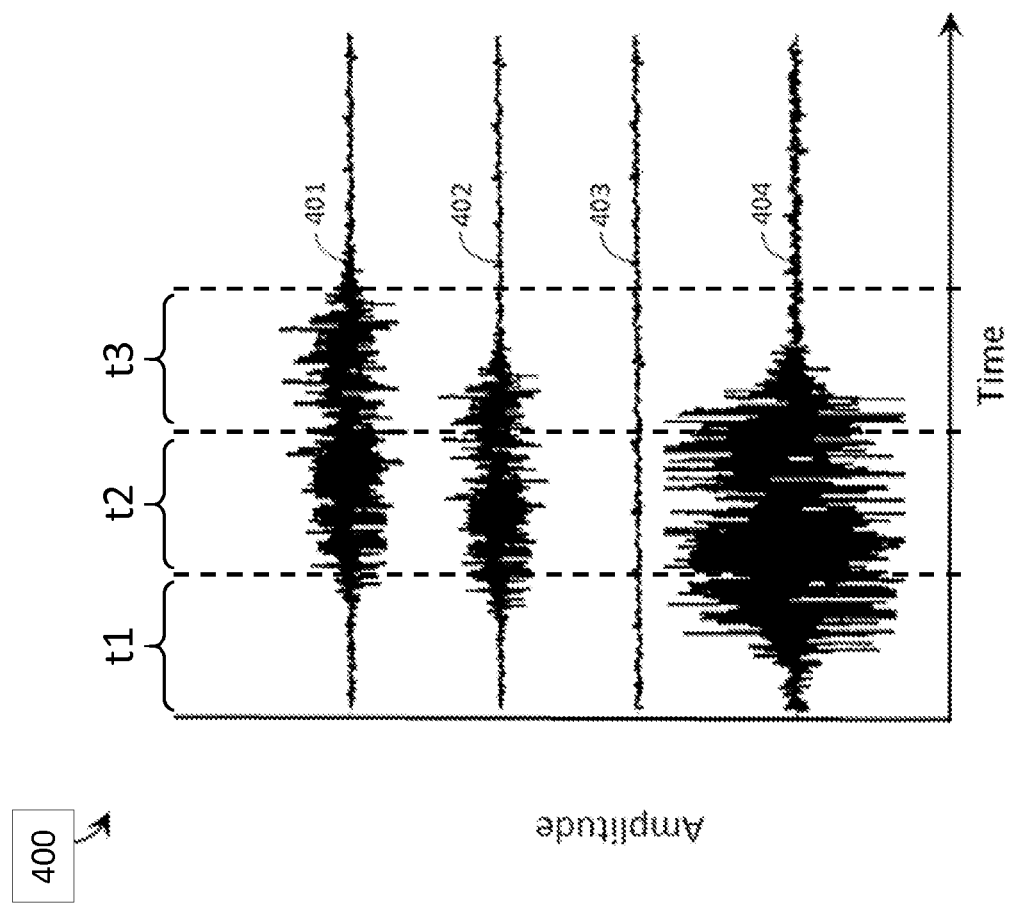
FIG. 4 is a graph showing an exemplary set of four signals corresponding to respective signal channels provided by each of four EMG sensors in a wearable EMG device in accordance with the present systems, articles, and methods.

FIG. 4 is a graph 400 showing an exemplary set of four signals 401, 402, 403, and 404 corresponding to respective signal channels provided by each of four EMG sensors in a wearable EMG device in accordance with the present systems, articles, and methods. For example, signal 401 may represent a signal provided by the EMG sensor 110 of sensor pod 101 in device 100, signal 402 may represent a signal provided by the EMG sensor 110 of sensor pod 103 in device 100, signal 403 may represent a signal provided by the EMG sensor 110 of sensor pod 105 in device 100, and signal 404 may represent a signal provided by the EMG sensor 110 of sensor pod 107 in device 100. Signals 401, 402, 403, 404 may represent a subset of the signals provided by a wearable EMG device having more than four EMG sensors, or they may represent all of the EMG signals provided by a wearable EMG device having four EMG sensors. Each signal 401, 402, 403, and 404 in the set of four signals has a respective amplitude (e.g., voltage) that varies over time.

Each EMG sensor (110) of the wearable EMG device (100) is positioned at a different location on the user (e.g., around the circumference of an armband such as in device 100) and is therefore uniquely positioned relative to various muscles of the user. For example, the EMG sensor (110) that provides signal 403 is positioned relatively close to a first muscle of the user and relatively far from a second muscle of the user, while the EMG sensor (110) that provides signal 404 is positioned relatively far from the first muscle of the user and relatively close to the second muscle of the user. During the time period that is depicted in FIG. 4, the user performs a physical gesture (i.e., a user-performed gesture) that involves substantial activity of some muscles (e.g., substantial activity of the second muscle) and no substantial (or insubstantial) activity of other muscles (e.g., insubstantial activity of the first muscle). Thus, each EMG sensor (110) in the wearable EMG device (100) detects different muscle activity during the gesture and, accordingly, each EMG sensor (110) in the wearable EMG device (100) provides a different signal. As will be described in more detail later, the time period when the user performs the gesture corresponds to the time period when the amplitude of one or more of signals 401, 402, 403, and 404 exceeds some threshold.

Signals 401, 402, 403, and 404 represent EMG signals provided by respective EMG sensors (110) for the duration of a user-performed gesture. The EMG sensors (110) providing signals 401, 402, and 404 detect substantial muscle activity during the user-performed gesture (and therefore provide signals of substantial amplitude) while the EMG sensor (110) providing signal 403 does not detect substantial muscle activity during the user-performed gesture (and therefore does not provide a signal of substantial amplitude). Per act 203 of method 200 from FIG. 2, the present systems, articles, and methods involve characterizing a signal vector $\vec{s}$ based on a set of signals provided from a set of EMG sensors, where characterizing the signal vector $\vec{s}$ may include, for example, determining a set of features of the set of EMG signals and casting the features as the elements of the signal vectors. The set of features may include any or all of various types of signal parameters, characteristics, etc. For example, the set of features may include a respective RMS value of each signal in the set of signals. Thus, as an example, a respective RMS value of each of signals 401, 402, 403, and 404 may be determined at act 203 of method 200 and a signal vector $\vec{s}$ may be characterized or otherwise defined such that the RMS values of signals 401, 402, 403, and 404 constitute the elements of the signal vector; i.e., $\vec{s} = [RMS_{401}, RMS_{402}, RMS_{403}, RMS_{404}]$. However, as described previously, some features (such as RMS values) can miss important signal characteristics if averaged out over the entire duration of the user-performed gesture. For example, a signal with multiple sharp peaks of high amplitude may produce a long-term RMS feature that is substantially similar to a signal with one broad peak of medium amplitude, even though the two signals clearly represent different muscle activity. In accordance with the present systems, articles, and methods, it can be advantageous to parcel, segment, or otherwise group the time-varying EMG signal from each respective EMG sensor (110) into discrete time windows or "portions" (time-synchronized across the signals from all EMG sensors) and to characterize a respective signal vector $\vec{s}_i$ for each time-synchronized portion of the set of EMG signals. In FIG. 4, each of signals 401, 402, 403, and 404 is divided into three time-synchronized portions: t1, t2, and t3. Three time-synchronized portions are used in FIG. 4 for illustrative purposes only. In alternative embodiments or applications, any number and/or size of time-synchronized portion(s) may be employed. Furthermore, time-synchronized portions t1, t2, and t3 in FIG. 4 are serially-connected, whereas in alternative embodiments any or all time-synchronized portions may overlap or there may be gaps therebetween.

Throughout this specification and the appended claims, the term "time-synchronized" as in "time-synchronized portions" is used to indicate that the time windows for each respective EMG signal (e.g., each of EMG signals 401, 402, 403, and 404) are substantially synchronized in time across all of the EMG signals. In other words, a first time-synchronized portion t1 represents substantially the same first window of time for each EMG signal in a set of EMG signals (e.g., for each of signals 401, 402, 403, and 404), a second time-synchronized portion t2 represents substantially the same second window of time for each EMG signal in the set of EMG signals (e.g., for each of signals 401, 402, 403, and 404), and so on.

In accordance with the present systems, articles, and methods, at least one respective signal vector $\vec{s}_i$ may be characterized for each respective time-synchronized portion (e.g., t1, t2, t3 of FIG. 4) of the EMG signal data provided by the EMG sensors (110) of a wearable EMG device (100). The respective signal vector $\vec{s}_i$ characterized for each time-synchronized portion may be based on a respective set of features of the EMG signals in each respective time-synchronized portion. For example, a first signal vector $\vec{s}_1$ may be characterized per act 203 of method 200 for a first time-synchronized portion t1 of the set of EMG signals provided by a set of EMG sensors (110), where the elements of the first signal vector $\vec{s}_1$ correspond to features (e.g., RMS values) of the time-synchronized first portions of the set of EMG signals; a second signal vector $\vec{s}_2$ may be characterized per act 203 of method 200 for a second time-synchronized portion t2 of the set of EMG signals provided by a set of EMG sensors (110), where the elements of the second signal vector $\vec{s}_2$ correspond to features (e.g., RMS values) of the time-synchronized second portions of the set of EMG signals; and so on. In this approach, method 200 of FIG. 2 may include capturing a respective time-synchronized first portion (t1) of each signal in the set of signals by the processor (130), wherein characterizing the set of signals as a first signal vector $\vec{s}_1$ by the processor (130) per act 203 includes characterizing the time-synchronized first portions (t1) of the signals in the set of signals as the first signal vector $\vec{s}_1$ by the processor (130). Method 200 may also be extended to include: capturing a respective time-synchronized second portion (t2) of each signal in the set of signals by the processor (130); characterizing the time-synchronized second portions (t2) of the signals in the set of signals as a second signal vector $\vec{s}_2$ by the processor (130); and determining a property of a second angle $\phi_1$ formed between the second signal vector $\vec{g}_2$ and the first gesture template vector $\vec{g}_1$ by the processor (130). In this case, identifying the user-performed gesture by the processor (130) per act 205 of method 200 may include identifying the first gesture as the user-performed gesture by the processor (130) if, at least: i) the property of the first angle $\theta_1$ satisfies the criterion, and ii) the property of the second angle $\phi_1$ satisfies the criterion. Method 200 may be further extended to include any number of time-synchronized portions of the set of EMG signals. In general, method 200 may be further extended to include: capturing a respective time-synchronized at least one additional portion (e.g., t3) of each signal in the set of signals by the processor (130); characterizing the time-synchronized at least one additional portions (e.g., t3) of the signals in the set of signals as at least one additional signal vector $\vec{s}_{add}$ by the processor (130); and determining a property of at least one additional angle $\psi_1$ formed between the at least one additional signal vector $\vec{s}_{add}$ and the first gesture template vector $\vec{g}_1$ by the processor (130). In this case, identifying the user-performed gesture by the processor (130) per act 205 may include identifying the first gesture as the user-performed gesture by the processor (130) if, at least: i) the property of the first angle $\theta_1$ satisfies the criterion, ii) the property of the second angle $\phi_1$ satisfies the criterion, and iii) the property of the at least one additional angle $\psi_1$ satisfies the criterion. For each time-synchronized portion, the gesture template vector $\vec{g}$ to which the signal vector $\vec{s}$ is compared may represent the entirety of a gesture from the gesture library G, or the gesture template vector $\vec{g}$ may represent a corresponding portion of the gesture from the gesture library G. In other words, the gesture template vectors $\vec{g}$ may be broken up into portions akin to the time-synchronized portions of the incoming EMG signal data and the first signal vector $\vec{s}_1$ may be compared to a first portion of the gesture template vector $\vec{g}$, the second signal vector $\vec{s}_2$ may be compared to a second portion of the gesture template vector $\vec{g}$, and so on.

In some applications, acts 201 and 202 of method 200 may be carried out for a relatively large period of time (i.e., a length of time that exceeds the duration of a user-performed gesture) with at least a portion of the corresponding data being stored in a non-transitory processor-readable medium (140). The data may then be parceled, segmented, divided, or otherwise grouped into time-synchronized portions as described above and respective iterations, rounds, or instances of at least acts 203 and 204 may be carried out for each respective time-synchronized portion. Thus, data may be collected throughout a user-performed gesture, stored, and subsequently processed by parceling, segmenting, dividing, or otherwise grouping the data into time-synchronized portions. However, this approach disadvantageously requires that all of the EMG signal data corresponding to a user-performed gesture be collected per acts 201 and 202 before the data analysis of acts 203 and 204 is carried out to produce an automated gesture identification per act 205. Such is not particularly well-suited to real-time gesture identification. In other applications, it can be advantageous to continuously collect EMG signal data per acts 201 and 202 and to actively capture the EMG signal data into time-synchronized portions and perform acts 203, 204, and 205 substantially in real-time.

For example, acts 201 and 202 may be performed continuously, or substantially continuously, beginning at time t0. After EMG signal data has been captured for the duration of a first time window t1, acts 203 and 204 (and potentially 205) may be performed using the EMG signal data captured during the first time window t1. While acts 203 and 204 are being performed for the first time window t1, acts 201 and 202 may continue to be carried out for a second time window t2. After EMG signal data has been captured for the duration of the second time window t2, acts 203 and 204 (and potentially 205) may be performed using the EMG signal data captured during the second time window t2 (i.e., EMG signal data collected while acts 203 and 204 were being performed using the EMG signal data collected during the first time window t1). While acts 203 and 204 are being performed for the second time window t2, acts 201 and 202 may continue to be carried out for a third time window t3, and so on.

Figure 5:
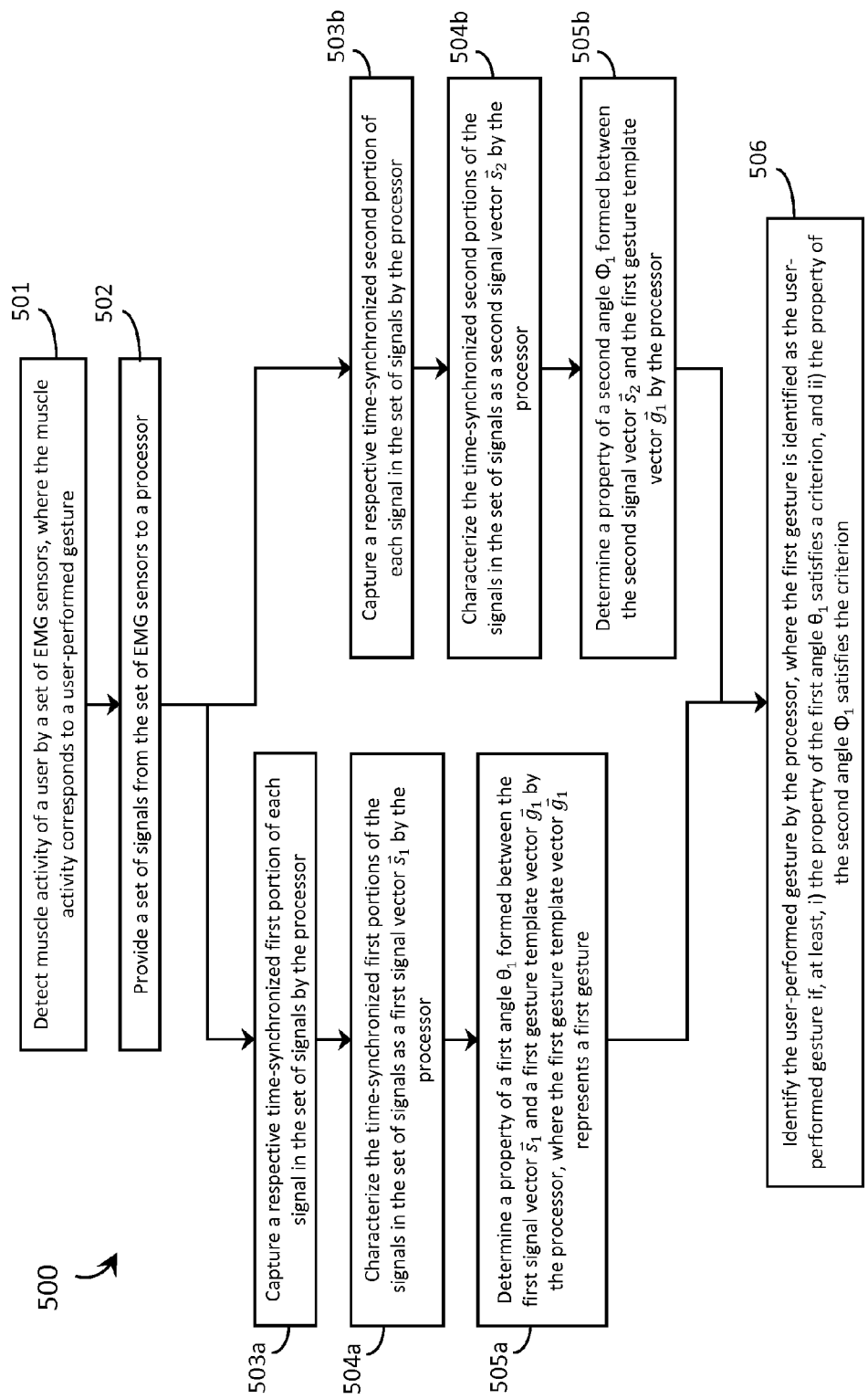
FIG. 5 is a flow-diagram showing a method of operating a wearable EMG device in accordance with the present systems, articles, and methods.

FIG. 5 is a flow-diagram showing a method 500 of operating a wearable EMG device in accordance with the present systems, articles, and methods. Method 500 is similar to method 200 from FIG. 2 in that method 500 is a method of identifying a gesture performed (e.g., identifying which gesture in a gesture library is performed) by a user of a wearable EMG device. The wearable EMG device includes a set of EMG sensors (the set of EMG sensors including multiple EMG sensors, i.e., at least two EMG sensors) and a processor and may form part of a human-electronics interface in which the wearable EMG device is used to provide gesture-based interaction with an electronic device.

Method 500 includes six acts 501, 502, 503, 504, 505, and 506, where at least two iterations, rounds, or instances of acts 503, 504, and 505 are performed in between acts 502 and 506, with the at least two iterations, rounds, or instances labeled as 503a/b, 504a/b, and 505a/b, respectively. Those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 500, the term "user" refers to a person that is wearing the wearable EMG device.

Acts 501 and 502 of method 500 are substantially similar to acts 201 and 202, respectively, of method 200.

At 501, a set of EMG sensors (110) of the wearable EMG device (100) detects muscle activity of a user. The muscle activity corresponds to a user-performed gesture (i.e., a physical gesture that is performed by the user). As an example, the wearable EMG device (100) may be worn on an arm of the user and the physical gesture may include a hand gesture such as a finger curl, a finger-splaying gesture, a finger flick, etc.

At 502, the set of EMG sensors (110) provides a set of signals to the processor (130) of the wearable EMG device (100) in response to the detected muscle activity of act 501. The signals may be, for example, electrical or optical signals routed from the EMG sensors (110) to the processor (130) through electrically conductive or optical communicative pathways (121, 122). Providing a set of signals from the set of EMG sensors (110) to the processor (130) may include providing a respective signal from each respective EMG sensor (110) in the set of EMG sensors to the processor (130). For example, each EMG sensor (110) in the set of EMG sensors may communicatively couple to the processor (130) using a respective signal channel to provide either analog or digital signals to the processor (130).

As described previously, the acts of detecting muscle activity of a user and providing EMG signals in response to the detected muscle activity (i.e., acts 501 and 502, respectively) may be carried out substantially continuously by a wearable EMG device (100). An activation threshold may be defined, and when the user performs a physical gesture one or more of the signals provided by the EMG sensors (e.g., the amplitude/magnitude of one or more of the signals) per act 502 may exceed the activation threshold. The time at which the activation threshold is exceeded may trigger the beginning (i.e., initialization at t0) of a first time window (i.e., the beginning of a first time-synchronized portion of the EMG signal data).

At 503a, the processor (130) of the wearable EMG device (100) captures a respective time-synchronized first portion of each signal in the set of signals (i.e., each signal provided by a respective EMG sensor (110) at act 502). As described previously, the respective time-synchronized first portion of each signal in the set of signals may be a respective parcel, segment, section, or window of the substantially continuous data stream provided by the EMG sensors (110) per act 502. The time-synchronized first portion of each signal in the set of signals may correspond to a first time window t1, as illustrated in FIG. 4.

Acts 504a and 505a of method 500 are substantially similar to acts 203 and 204, respectively, of method 200 except that acts 504a and 505a are each specifically performed or carried out on/using the time-synchronized first portions of the signals in the set of signals.

At 504a, the processor (130) of the wearable EMG device (100) characterizes the time-synchronized first portions of the signals provided at act 503a as a first signal vector $\vec{s}_1$. Characterizing the time-synchronized first portions of the signals as a first signal vector $\vec{s}_1$ by the processor (130) may include determining at least one respective feature of the respective time-synchronized first portion of each signal in the set of signals such that the first signal vector $\vec{s}_1$ is defined in an N-dimensional space, where N≥2 is the number of signals in the set of signals (which may, for example, be equal to the number of EMG sensors (110) in the wearable EMG device (100)). The set of features may include characteristics, parameters, magnitudes, or generally any property or properties of the time-synchronized first portions of the signals in the set of signals, including without limitation respective RMS values of the time-synchronized first portions of the signals in the set of signals.

At 505a, the processor (130) determines a property of a first angle $\theta_1$ formed between the first signal vector $\vec{s}_1$ and a first gesture template vector $\vec{g}_1$, where the first gesture template vector $\vec{g}_1$ represents a first gesture. The property may include, for example, a magnitude of the first angle $\theta_1$ or a value of a trigonometric function applied to the first angle $\theta_1$, such as a cosine of the first angle $\theta_1$ (i.e., $\cos \theta_1$) or a sine of the first angle $\theta_1$ (i.e., $\sin \theta_1$). In some applications, act 505a may more generally include, for each gesture template vector $\vec{g}_i$ in a library of gesture template vectors G, each gesture template vector $\vec{g}_i$ representing a respective gesture, determining, by the processor (130), a property of an angle $\theta_i$ formed between the first signal vector $\vec{s}_1$ and the gesture template vector $\vec{g}_i$, which necessarily includes determining a property of a first angle $\theta_1$ formed between the first signal vector $\vec{s}_1$ and a first gesture template vector $\vec{g}_1$ by the processor (130).

As described previously, a time-synchronized second portion (i.e., a second time window) of each signal in the set of signals may be captured and processed in series, in parallel, in tandem, or otherwise in combination with the time-synchronized first portion (i.e., the first time window) of each signal in the set of signals. For example, in method 500, acts 503a, 504a, and 505a represent the capturing and processing of a time-synchronized first portion of each signal in the set of signals and acts 503b, 504b, and 505b represent the capturing and processing of a time-synchronized second portion of each signal in the set of signals. Acts 503b, 504b, and 505b are substantially similar to acts 503a, 504a, and 505a (respectively) except that acts 503b, 504b, and 505b are performed or carried out on/using time-synchronized second portions of the signals provided by the EMG sensors (110) and involve processing a second signal vector $\vec{s}_2$ while acts 503a, 504a, and 505a are performed or carried out on/using time-synchronized first portions of the signals provided by the EMG sensors (110) and involve processing a first signal vector $\vec{s}_1$. In FIG. 5, acts 503b, 504b, and 505b are shown vertically offset from (i.e., shifted downwards with respect to) acts 503a, 504a, and 505a to represent that the time-synchronized second portions of the signals in the set of signals correspond to a time window that begins after the beginning of the time-synchronized first portions of the signals in the set of signals and extends after the end of the time-synchronized first portions of the signals in the set of signals.

At 503b, the processor (130) of the wearable EMG device (100) captures a respective time-synchronized second portion of each signal in the set of signals (i.e., each signal provided by a respective EMG sensor (110) at act 502). As described previously, the respective time-synchronized second portion of each signal in the set of signals may be a respective parcel, segment, section, or window of the substantially continuous data stream provided by the EMG sensors (110) per act 502. The time-synchronized second portion of each signal in the set of signals may correspond to a second time window t2, as illustrated in FIG. 4. The time-synchronized second portion of each signal in the set of signals (e.g., the second time window t2 illustrated in FIG. 4) may begin at least approximately when the time-synchronized first portion of each signal in the set of signals (e.g., the first time window t1 illustrated in FIG. 4) ends as illustrated in FIG. 4, or the time-synchronized second portion of each signal in the set of signals may overlap with (and extend beyond the end of) the time-synchronized first portion of each signal in the set of signals, or there may be a gap between the end of the time-synchronized first portion of each signal in the set of signals and the beginning of the time-synchronized second portion of each signal in the set of signals.

At 504b, the processor (130) of the wearable EMG device (100) characterizes the time-synchronized second portions of the signals provided at act 503b as a second signal vector $\vec{s}_2$ in substantially the same way as described for act 504a and act 203 of method 200.

At 505b, the processor (130) determines a property of a second angle $\phi_1$ formed between the second signal vector $\vec{s}_2$ and the first gesture template vector $\vec{g}_1$ in substantially the same way as described for act 505a and act 204 of method 200.

As illustrated in FIG. 5, method 500 includes two iterations, rounds, or instances of acts 503, 504, and 505 (i.e., 503a/b, 504a/b, and 505a/b, respectively) corresponding to two time-synchronized portions of each signal in the set of signals (e.g., two time windows). However, in practice, method 500 may include any number of iterations, rounds, or instances of acts 503, 504, and 505 corresponding to any number of time-synchronized portions of each signal in the set of signals (e.g., any number of time windows), including more than two iterations, rounds, or instances of acts 503, 504, and 505 (such as at least one additional time-synchronized portion or each signal in the set of signals).

At 506, the processor (130) of the wearable EMG device (100) identifies the user-performed gesture in a manner similar to that described for act 205 of method 200. The first gesture may be identified as the user-performed gesture if, at least, i) the property of the first angle $\theta_1$ satisfies a criterion, and ii) the property of the second angle $\phi_1$ satisfies the criterion. If the first gesture is not identified as the user-performed gesture (i.e., because either the property of the first angle $\theta_1$ or the property of the second angle $\phi_1$, or both, does not satisfy the criterion), then act 505 (including multiple iterations, rounds, or instances thereof, as in acts 505a/b) may be repeated for at least a second gesture template vector $\vec{g}_2$ in a library of gesture template vectors G, where the second gesture template vector $\vec{g}_2$ represents a second gesture, and so on, until a gesture template vector $\vec{g}*$ having angles $\theta*$ and $\phi*$ that do satisfy the criterion is identified.

As will be clear to a person of skill in the art based on the description of FIG. 5, the various embodiments described herein include iterative methods for performing automated gesture identification in real-time. Each iteration in such an iterative method may correspond to a respective time-synchronized portion or window of the data streams provided by the EMG sensors (110) of a wearable EMG device (100). This concept is illustrated in FIG. 6.

Figure 6:
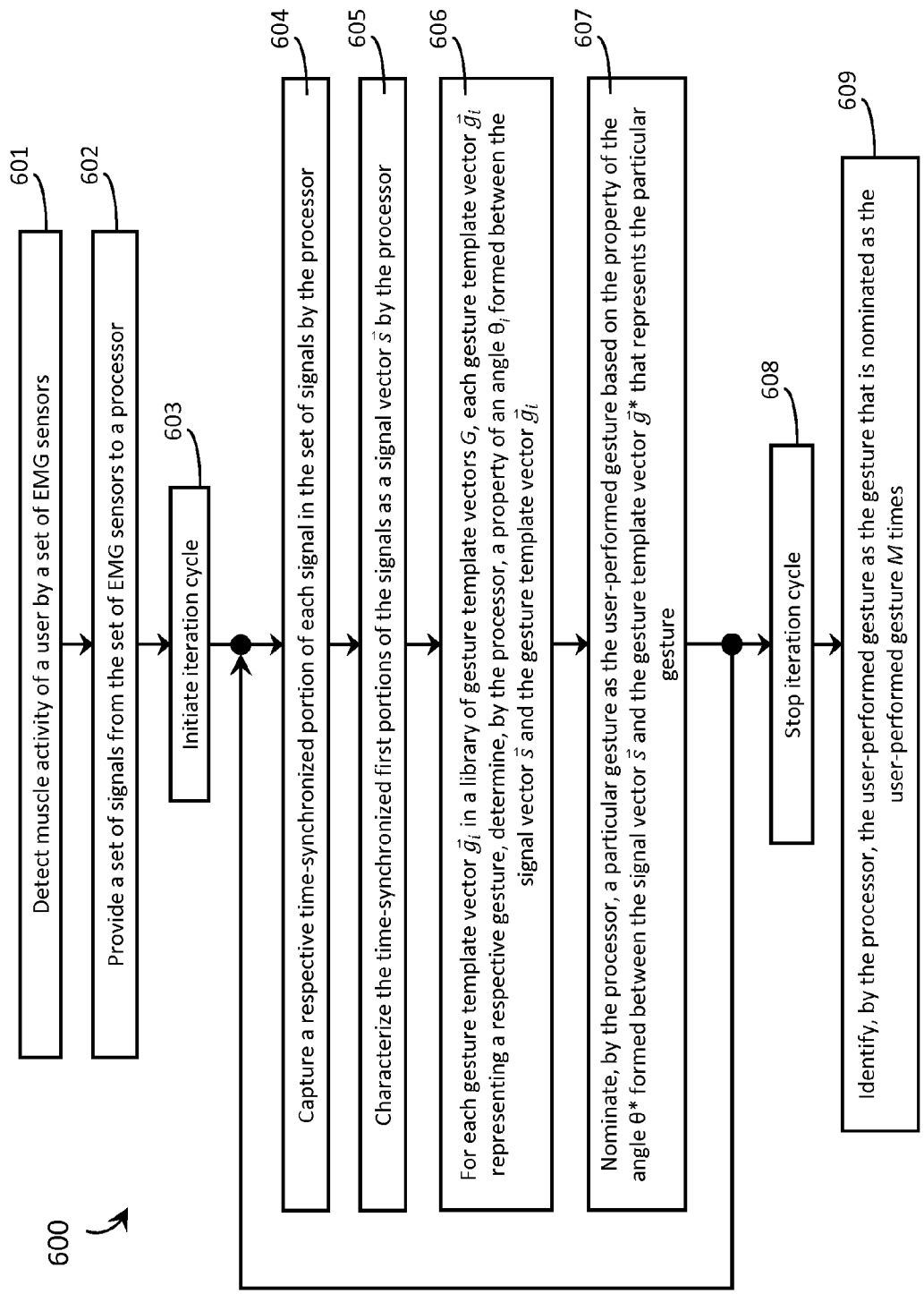
FIG. 6 is a flow-diagram showing a method of identifying which gesture in a gesture library is performed by a user of a wearable EMG device in accordance with the present systems, articles, and methods.

FIG. 6 is a flow-diagram showing a method 600 of identifying which gesture in a gesture library is performed by a user of a wearable EMG device in accordance with the present systems, articles, and methods. The wearable EMG device includes a set of EMG sensors (the set of EMG sensors including multiple EMG sensors, i.e., at least two EMG sensors) and a processor communicatively coupled to the set of EMG sensors, and may form part of a human-electronics interface in which the wearable EMG device is used to provide gesture-based interaction with and/or control of an electronic device.

Method 600 includes nine acts 601, 602, 603, 604, 605, 606, 607, 608, and 609, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. Method 600 is an iterative method in which acts 604-607 may be performed any number of times. For the purpose of method 600, the term "user" refers to a person that is wearing the wearable EMG device.

At 601, the set of EMG sensors (110) detects muscle activity of a user in response to the user performing a physical gesture. Act 601 may be substantially similar to act 201 from method 200 and act 501 from method 500.

At 602, the set of EMG sensors (110) provides a set of signals to the processor (130) of the wearable EMG device (100). Each signal in the set of signals may be provided by a respective one of the EMG sensors (110) in the set of EMG sensors. Act 602 may be substantially similar to act 202 from method 200 and act 502 from method 500.

Depending on the nature of the EMG sensors employed, acts 601 and 602 may be performed or carried out substantially continuously by the wearable EMG device (100), either at all times (while the device is worn by the user) or specifically whenever the user performs a gesture involving sufficient muscle activity so as to be detected by the EMG sensors (110) per act 601. For example, a surface EMG sensor that is coupled to electrical activity in a user's arm may substantially continuously detect any detectable changes in that electrical activity and may substantially continuously provide signals in response to any detectable changes. In this case, the acts of detecting muscle activity (601) and providing signals (602) may be performed substantially concurrently, or sequentially with a negligible delay to account for signal propagation. In order to help distinguish the muscle activity of a deliberate gesture from background muscle activity (such as the muscle activity produced when a user is simply walking or scratching their head), the wearable EMG device (100) may be configured to implement one or more activation thresholds. For example, acts 603-609 involve or are based on processing the signals provided by the EMG sensors (110) at act 602. In applications that employ one or more activation thresholds, acts 603-609 of method 600 may only be performed or carried out when at least one signal provided by at least one EMG sensor (110) at act 602 exceeds an activation threshold.

At 603, an iteration cycle is initiated. Each iteration involves performing acts 604, 605, 606, and 607, and the iteration cycle is repeated until a same gesture is nominated as the user-performed gesture M times, where M≥2.

At 604, the processor (130) of the wearable EMG device (100) captures a respective time-synchronized portion of each signal in the set of signals provided by the EMG sensors (110) at act 602. For example, in a first iteration a respective time-synchronized first portion of each signal is captured, in a second iteration a respective time-synchronized second portion of each signal is captured, and so on, up to a final $K^{th}$ iteration in which a respective time-synchronized $K^{th}$ portion of each signal is captured (where K is an integer equal to the number of iterations performed). As described previously, the respective time-synchronized portions of successive iterations may be serially/sequentially connected, or they may overlap, or there may be gaps therebetween. Capturing a respective time-synchronized portion of each signal in the set of signals may include, for example, collecting and storing data from each signal in the set of signals for a defined period of time, such as from a beginning point $t_{start}$ to an end point $t_{end}$.

At 605, the processor (130) characterizes the time-synchronized first portions of the signals as a signal vector $\vec{s}$. As described previously (e.g., in the context of act 203 of method 200 and act 504 of method 500), the signal vector $\vec{s}$ may be characterized in an N-dimensional space (N≥2), where each dimension corresponds to a respective parameter or feature of a respective signal in the set of signals provided by the EMG sensors (110) at act 602.

At 606, the processor (130) determines a respective property of each respective angle $\theta_i$ formed between the signal vector $\vec{s}$ and respective ones of the gesture template vectors $\vec{g}_i$ in a library of gesture template vectors G, where each gesture template vector $\vec{g}_i$ represents a respective gesture that the wearable EMG device (100) is operative to identify. For each angle $\theta_i$ the property may include, for example, a magnitude of the angle $|\theta_i|$ or a value of a trigonometric function applied to the angle $\theta_i$, such as a cosine of the angle $\theta_i$ (i.e., cos $\theta_i$) or a sine of the angle $\theta_i$ (i.e., sin $\theta_i$).

At 607, the processor (130) nominates a particular gesture $\vec{g}*$ as the user-performed gesture based on the properties of the angles $\theta_i$ formed between the signal vector $\vec{s}$ and the gesture template vectors $\vec{g}_i*$ as determined at act 606. In some instances, the gesture that is nominated may be an "unknown" gesture, a "rest" gesture, or a "no gesture" if such gestures are included in the gesture library and/or if no other gesture in the gesture library is nominated as the user-performed gesture. For the purposes of the present systems, articles, and methods, to "nominate" a gesture as the user-performed gesture by a processor (130) means: i) to indicate, determine, propose, select, or otherwise identify the gesture as the most likely candidate to be the user-performed gesture by the processor (130), and/or ii) to return the gesture as the user-performed gesture for one iteration in a set of multiple iterations, where the gesture is ultimately identified as the user-performed gesture if it is nominated as the user-performed gesture in M iterations in the set of iterations. In method 600, each iteration corresponds to processing a respective time-synchronized portion of the signals provided by a set of EMG sensors (110); thus, in the context of method 600, to "nominate" a gesture as the user-performed gesture in a $j^{th}$ iteration means to indicate, determine, propose, or otherwise identify that the nominated gesture appears to be the user-performed gesture for the particular time-synchronized $j^{th}$ portion of the EMG signal data that is processed in the $j^{th}$ iteration. The probability that a nominated gesture is the user-performed gesture increases with each re-occurrence of the same nominated gesture across multiple iterations of acts 604-607 of method 600; thus, the iteration cycle initiated at act 603 may repeat until a same gesture is nominated as the user-performed gesture M times, where M≥2. Depending on the particular application, M may be any number, such as 3, 4, 5, 10, etc. In some implementations, it may be a requirement that the same gesture be nominated M times in a row (i.e., in succession), or M times out of X iterations, where (X−M)=Z and Z may be specified as, for example, 1, 2, 3, 4, 5, etc.

At 608, the iteration cycle is stopped because a same gesture is nominated as the user-performed gesture M times. As previously described, default gestures such as "no gesture," "rest," and/or "unknown" may be included in the gesture library and may prevent the iteration cycle from continuing indefinitely when no other gesture is identified as the user-performed gesture. In some implementations, act 608 may be omitted such that act 609 is executed directly after an instance of act 607 without stopping the iteration cycle of acts 604-607. In other words, some implementations of method 600 may continue to perform acts 601, 602, and 604-607 essentially indefinitely (i.e., while the wearable EMG device (100) is powered on and active) and only extend to include act 609 in iterations where a same gesture is nominated as the user-performed gesture for an $M^{th}$ time.

At 609, the processor (130) identifies the user-performed gesture as the gesture that is nominated M times in the iteration cycle of acts 603-608. The identified user-performed gesture may then be returned or submitted for further processing (e.g., for mapping to a particular function or action) and/or information related to the identified gesture may be transmitted to one or more receiving device(s), as described in U.S. Provisional Patent Application Ser. No. 61/869,526 (now U.S. Non-Provisional patent application Ser. No. 14/465,194).

Method 600 may be implemented, executed, performed, or otherwise carried out by exemplary wearable EMG device 100 from FIG. 1, or more generally by any wearable EMG device that includes: a set of EMG sensors (110) responsive to (i.e., to detect and provide a set of signals in response to detecting) muscle activity corresponding to a gesture performed by a user of the wearable EMG device (100) per acts 601 and 602; a processor (130) communicatively coupled to the set of EMG sensors (110); and a non-transitory processor-readable storage medium (140) communicatively coupled to the processor (130), the non-transitory processor-readable storage medium (140) storing processor-executable gesture identification instructions (141) that, when executed by the processor (130), cause the processor (130) to: i) until a same gesture is nominated as the user-performed gesture M times, where M≥2, iteratively: capture a respective time-synchronized portion of each signal in the set of signals per act 604 of method 600; characterize the time-synchronized portions of the signals in the set of signals as a signal vector $\vec{s}$ per act 605 of method 600; for each gesture template vector $\vec{g}_i$ in a library of gesture template vectors G, each gesture template vector $\vec{g}_i$ representing a respective gesture, determine a property of an angle $\theta_i$ formed between the signal vector $\vec{s}$ and the gesture template vector $\vec{g}_i$ per act 606 of method 600; and nominate a gesture as the user-performed gesture based on determining, for each gesture template vector $\vec{g}_i$ in the library of gesture template vectors G, a property of an angle $\theta_i$ formed between the signal vector $\vec{s}$ and the gesture template vector $\vec{g}_i$ per act 607 of method 600; and, in response to nominating a same gesture as the user-performed gesture M times: stop the iteration per act 608 of method 600; and identify the user-performed gesture as the gesture that is nominated as the user-performed gesture M times per act 609 of method 600.

The signals that are detected and provided by the EMG sensors (110) of a wearable EMG device (100) when a user performs a gesture may not be identical each time the same gesture is performed. Discrepancies between different instances of the same gesture may result from variations in many different use parameters, including but not limited to: signal noise (e.g., signal to noise ratio), discrepancies in how the gesture is performed, shifts or variations in the orientation and/or position of the wearable EMG device (100) during or between gestures, a different user performing the same gesture, muscle fatigue, a change in environmental or skin conditions, etc. The various embodiments described herein provide systems, articles, and methods for operating a wearable EMG device (100) to identify a gesture (or gestures) performed by a user with improved robustness against such variations in use parameters. Improved robustness is achieved, at least in part, by matching the direction of a vector representation of the EMG signal data (i.e., a signal vector $\vec{s}$) to the direction of a vector representation of stored gesture data (i.e., a gesture template vector $\vec{g}$), where said directions may be independent of the respective magnitudes of said vector representations. Furthermore, the data stored and processed in the various embodiments described herein is relatively small (in terms of system memory required for storage) and the calculations and other acts involved in processing said data can readily be executed by a relatively low-power, low-performance processor.

As previously described, in some applications it may be advantageous to combine EMG signals with motion signals sensed, measured, or otherwise detected by, for example, at least one inertial sensor such as a linear accelerometer and/or a gyroscope. To this end, any or all of the systems, articles, and methods for wearable EMG devices (100) described herein may include at least one inertial sensor (e.g., IMU 160 of device 100), and any or all of methods 200, 500, and/or 600 may further include detecting motion corresponding to the gesture performed by the user by the at least one inertial sensor (160), providing at least one signal from the at least one inertial sensor (160) to the processor (130) of the wearable EMG device (100) in response to the detected motion, and processing the at least one signal from the at least one inertial sensor (160) by the processor (130). In this case, identifying the user-performed gesture by the processor (130) may include identifying the user-performed gesture by the processor (130) based at least in part on an outcome of the processing the at least one signal from the at least one inertial sensor (160) by the processor (130). For example, any or all of methods 200, 500, and/or 600 may include incorporating at least one feature or property of the at least one signal from the at least one inertial sensor (160) in the characterization of one or more signal vector(s) $\vec{s}$ (i.e., assigning at least one axis of the N-dimensional space in which the signal vector $\vec{s}$ is characterized to a corresponding property or feature of the signal data from the at least one inertial sensor) such that the resulting gesture identification is based, at least in part, on an outcome of processing the at least one signal from the at least one inertial sensor (160) by the processor (130). Alternatively, signal data from one or more inertial sensors may be combined with a result of any or all of methods 200, 500, and/or 600 such that the gesture identification is based, at least in part, on an outcome of the processing the at least one signal from the at least one inertial sensor by the processor. The inclusion of motion-based signal data (from one or more inertial sensor(s)) can significantly increase the number of gestures that can be identified by the wearable EMG device (100) and/or increase the distinctiveness of each gesture. For example, a "finger snap" gesture may, in some implementations, be difficult to discern but accurate identification of a "finger snap" gesture may be significantly augmented by combining the EMG signal data with inertial and/or motion data provided by at least one inertial and/or motion sensor (160).

The ability of the wearable EMG devices described herein to accurately identify gestures may benefit, in some implementations, from specific information about at least some use parameters. For example, in order for a wearable EMG device (100) to perform accurate gesture identification as described herein, the wearable EMG device (100) may require information about the location, position, and/or orientation of its EMG sensors (110) in relation to the muscles of the user. In accordance with the present systems, articles, and methods, all of the necessary information about the location, position, and/or orientation of the EMG sensors (110) may be readily collected by the wearable EMG device (100) by having the user perform a single reference gesture when the wearable EMG device (100) is first donned. Such is a considerable improvement over the elaborate training procedures (requiring the user to perform a series of multiple trials for each of multiple gestures) required by known proposals for wearable EMG devices that perform gesture identification.

A user may be instructed to don a wearable EMG device on, for example, one of their forearms with any orientation and at any location above the wrist and below the elbow that provides a comfortable, snug fit. A feature of exemplary wearable EMG device 100 from FIG. 1 is that the order of the EMG sensors 110 around the perimeter of the device 100 is fixed. That is, each EMG sensor 110 is positioned adjacent and in between the same two other EMG sensors 110 regardless of the position and/or orientation of the device 100. Furthermore, the angular spacing between EMG sensors 110 remains substantially constant as described in U.S. Provisional Patent Application Ser. No. 61/860,063 (now U.S. Non-Provisional patent application Ser. No. 14/276,575), which is incorporated herein by reference in its entirety. Thus, assuming the device 100 is snugly fit on the forearm of the user, in order to determine the position and/or orientation of the EMG sensors 110 on the forearm of the user, only three things need to be determined by the wearable EMG device 100: i) on which arm of the user is the device 100 being worn, ii) what is the rotational orientation of the device 100; and iii) what is the front-to-back orientation of the device 100? In accordance with the present systems, articles, and methods, having the user perform a single reference gesture can provide all of the information necessary to answer each of these three questions. As an example, this may be done by storing (e.g., in the on-board memory (140) of the wearable EMG device (100)) a set of reference gesture template vectors $\vec{g}_{Ref-i}$ that all correspond to the same reference gesture for different positions and/or orientations of the wearable EMG device (100), executing any of methods 200, 500, or 600 using the set of reference gestures $\vec{g}_{Ref-i}$, and when a particular reference gesture template vector $\vec{g}_{Ref}*$ is identified as the user-performed gesture, using the configuration of the axes of the N-dimensional space in which the particular reference gesture template vector $\vec{g}_{Ref}*$ is defined to calibrate the configuration of the axes of the N-dimensional space in which the gesture template vectors $\vec{g}_i$ in the library of gesture template vectors G are defined (e.g., by matching the configuration of the axes of the N-dimensional space in which the gesture template vectors $\vec{g}_i$ in the library of gesture template vectors G are defined to the configuration of the axes of the N-dimensional space in which the particular reference gesture template vector $\vec{g}_{Ref}*$ is defined). As an alternative example, only one reference gesture template vector $\vec{g}_{Ref}$ may be stored in the memory (140) of the wearable EMG device (100), and when the user performs the reference gesture the configuration of the axes of the N-dimensional space in which the reference gesture template vector $\vec{g}_{Ref}$ is defined may be varied until the gesture template vector $\vec{g}_{Ref}$ best matches a signal vector $\vec{s}$ representing the user's performance of the reference gesture. The configuration of the axes of the N-dimensional space in which the reference gesture template vector $\vec{g}_{Ref}$ is defined that causes the gesture template vector $\vec{g}_{Ref}$ to best match the signal vector $\vec{s}$ representing the user's performance of the reference gesture may then be used to calibrate the configuration of the axes of the N-dimensional space in which the gesture template vectors $\vec{g}_i$ in the library of gesture template vectors G are defined (e.g., by matching the configuration of the axes of the N-dimensional space in which the gesture template vectors $\vec{g}_i$ in the library of gesture template vectors G are defined to the configuration of the axes of the N-dimensional space in which the reference gesture template vector $\vec{g}_{Ref}$ is defined).

While many different gestures may be used as a reference gesture, an example of a suitable reference gesture is: begin with the arm (i.e., the arm upon which the device is worn) extended out in front and with the hand forming a loose fist with the thumb on top such that the back or dorsal side of the thumb faces upwards, then open the hand and bend the wrist outwards such that the open palm faces forwards and the extended fingers point outwards approaching ninety degrees to the forearm (i.e., as far past about forty-five degrees that is comfortable for the user).

As described above, a user may calibrate a wearable EMG device in accordance with the present systems, articles, and methods by performing only a single reference gesture. In some applications, no further training procedures may be required before the device can begin identifying gestures performed by the user.

In accordance with the present systems, articles, and methods, changes in the position and/or orientation of the wearable EMG device (100) may produce changes (e.g., shifts, rotations, etc.) in the resulting signals provided by the EMG sensors (110) when the user performs a physical gesture. An initial reference gesture as described herein is used to determine the "orientation" of the EMG sensor signals. If the rotational orientation of device 100 is varied by, for example, 180 degrees, then the corresponding EMG sensor signals may also be "rotationally reoriented" by 180 degrees. If the front-to-back orientation of device 100 is also varied, then the corresponding EMG sensor signals may also be "front-to-back reoriented." In either case (or in both cases), the gesture template vectors $\vec{g}_i$ (e.g., the configuration of the axes of the N-dimensional space in which the gesture template vectors $\vec{g}_i$ are defined) may be recalibrated to reflect the position and/or orientation of device 100 on the user's forearm based on the reference gesture. Alternatively, the incoming EMG signals may be adjusted (e.g., relabeled, renumbered, etc.) to reflect the positions of the corresponding EMG sensors from which the signals were provided as determined by processing the reference gesture.

The position and/or orientation of the wearable EMG device (100) may change during use (e.g., during an extended session of continuous use, such as continuous use for on the order of hours). Accordingly, the various embodiments described herein may include monitoring a quality of match between the signal data provided by the EMG sensors (110) and the gesture identified based on that signal data. In such implementations, the non-transitory processor-readable storage medium (140) of the wearable EMG device (100) may include processor-executable quality monitoring instructions that, when executed by the processor (130) of the wearable EMG device (100), cause the processor (130) to monitor a quality of match between the signal data provided by the EMG sensors (110) and the gesture identified based on that signal data. If the quality of match shows signs of degradation (or, for example, the wearable EMG device (100) is unable to recognize a gesture performed by the user after one or more attempts) then the wearable EMG device (100) may be configured to prompt the user to perform or repeat the reference gesture. The wearable EMG device (100) may prompt the user to perform or repeat the reference gesture by, for example, illuminating or flashing a corresponding light emitting diode (LED) or other visual indicator, by activating a vibratory motor or other actuator providing haptic or tactile feedback to the user, and so on. Alternatively, the user may identify degradation in the accuracy of gesture identification and volunteer to perform or repeat the reference gesture. The user may signify an intent to perform or repeat the reference gesture by, for example, toggling a switch or button on the wearable EMG device (100), or by performing an unambiguously identifiable gesture such as tapping/smacking the wearable EMG device (100) multiple times in quick succession (which is clearly detected by an inertial sensor (160)), etc. The wearable EMG device (100) may be configured to sense when it has been removed by the user (e.g., by sensing an extended period of no inertial sensor activity, or by identifying erratic signals that may be produced by the EMG sensors (110) when they are no longer coupled to the user's body) and to expect a reference gesture when it is put back on by a user.

Various embodiments of the present systems, articles, and methods are described as potentially (e.g., optionally) employing at least one activation threshold. As an example, acts 201 and 202 (and in some implementations, act 203) of method 200 may be repeatedly or continuously performed by the wearable EMG device (100) whenever the wearable EMG device (100) is powered on (and worn by a user). However, acts 204 and/or 205 may only be triggered/completed when at least one signal in the set of signals provided at act 202 exceeds a threshold. In the exemplary case of the signal vector $\vec{s}$ comprising a set of RMS values (i.e., $\vec{s}=[RMS_1, RMS_2, \ldots, RMS_N]$), an RMS baseline value of each signal channel in its "rest" or "quiescent" state (i.e., when there is no muscle activity detected) may first be determined and then acts 204 and/or 205 may only be triggered/completed when at least one RMS value in the set of RMS values determined at 203 exceeds the corresponding "rest" or "quiescent" state for that signal channel by a defined percentage, such as by 50%, by 100%, by 150%, etc. In this case, the activation threshold is represented as the percentage (%) above the "rest" or "quiescent" state that an RMS value must reach in order to trigger completion of acts 204 and/or 205. However, a "rest" or "quiescent" state RMS value may be zero, so a person of skill in the art will appreciate that other threshold schemes may be preferred, including but not limited to: a defined percentage (%) of the mean RMS value for the signal channel, a defined percentage (%) of the maximum RMS value for the signal channel, a fixed minimum RMS value, and so on. In some implementations, the definition of the activation threshold may adjust to accommodate new data (e.g., the mean RMS value for each signal channel may be continuously, repeatedly or periodically monitored and updated when applying an activation threshold based on the mean RMS value for each signal channel). In order to limit the number of "false positives" (i.e., the number of instances where acts 204 and/or 205 are triggered/completed when the user has not performed a deliberate gesture), it may be advantageous to implement multiple activation thresholds that must be exceeded substantially simultaneously (and/or a single activation threshold that must be exceeded by multiple values substantially simultaneously) in order to trigger completion of acts 204 and/or 205. For example, in some implementations, acts 204 and/or 205 of method 200 may only be triggered when multiple (e.g., at least two, or at least three, etc.) features in the set of features determined at act 203 exceed at least one activation threshold at substantially the same time.

In accordance with the present systems, articles, and methods, a user's reference gesture may be used to establish at least one activation threshold and/or to normalize EMG signals for that particular user. The reference gesture may be, for example, deliberately selected to involve a Maximum Voluntary Contraction, or MVC, of the user (the exemplary reference gesture described herein is an example of this, where the outward extension of the fingers and bending back of the wrist reaches a maximum point of mobility for most users) and/or the user may be, for example, instructed to perform the reference gesture with particular vigor. In either case, the reference gesture may provide reference values (for example, maximum RMS values) that may be used by the processor (130) to set activation thresholds and/or to normalize signals provided by the EMG sensors (110) for the specific user.

The duration of a user-performed gesture may be broken down into multiple stages, such as a beginning stage, a set of middle stages, and an end stage. In accordance with the present systems, articles, and methods, a wearable EMG device (100) may store and implement multiple (i.e., two or more) libraries of gesture template vectors $G_i$ in a single gesture identification process, where each library of gesture template vectors $G_i$ is designed or otherwise suited to correspond to a respective gesture stage. For example, a first library of gesture template vectors $G_1$ may comprise gesture template vectors $\vec{g}_{1-i}$ designed or otherwise suited to identify a user-performed gesture based on one or more feature(s) of the beginning stage of a user-performed gesture, a second library of gesture template vectors $G_2$ may comprise gesture template vectors $\vec{g}_{2-i}$ designed or otherwise suited to identify a user-performed gesture based on one or more feature(s) of a first middle stage of a user-performed gesture, and so on. The various embodiments described herein may include or be adapted to include combining the outcomes of multiple analyses each invoking at least one library of gesture template vectors G from a collection of libraries of gesture template vectors $G_i$.

The various embodiments described herein may be implemented as an alternative to, or in combination with, the systems, articles, and methods for gesture identification described in U.S. Provisional Patent Application Ser. No. 61/881,064 (now U.S. Non-Provisional patent application Ser. No. 14/494,274) and/or U.S. Provisional Patent Application Ser. No. 61/894,263 (now U.S. Non-Provisional patent application Ser. No. 14/520,081), both of which are incorporated by reference herein in their entirety.

The various embodiments described herein provide systems, articles, and methods for enhancing the automatic gesture recognition performance of a wearable electronic device. A wearable EMG device that detects and process EMG signals is frequently described herein for illustrative purposes, but other forms of controllers (i.e., controllers that are not wearable and/or controllers that do not employ EMG sensors) may similarly be configured to implement the teachings herein. For example, instead of or in addition to employing EMG sensors and/or inertial sensors providing gesture control, a controller that operates in accordance with the present systems, articles, and methods may employ, for example, tactile sensors (e.g., buttons, switches, touchpads, or keys) providing manual control, acoustic sensors providing voice-control, optical/photonic sensors providing gesture control, or any other type(s) of user-activated sensors providing any other type(s) of user-activated control. Furthermore, EMG sensors are used herein as an example of "muscle activity sensors" and the present systems, articles, and methods may be implemented using other forms of muscle activity sensors (either on their own or in combination with EMG sensors), including without limitation mechanomyography sensors and/or magnetomyography sensors. Thus, the teachings of the present systems, articles, and methods may be applied using virtually any type of controller employing sensors (including gesture-based control devices that do not make use of electromyography or EMG sensors), with the acts described herein as being performed by "at least one EMG sensor" and/or "at least one inertial sensor" being more generally performed by "at least one sensor."

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/915,338; U.S. Provisional Patent Application Ser. No. 61/857,105 (now U.S. Non-Provisional patent application Ser. No. 14/335,668); U.S. Provisional Patent Application Ser. No. 61/752,226 (now U.S. Non-Provisional patent application Ser. No. 14/155,107); U.S. Provisional Patent Application Ser. No. 61/768,322 (now U.S. Non-Provisional patent application Ser. No. 14/186,889); U.S. Provisional Patent Application Ser. No. 61/771,500 (now U.S. Non-Provisional patent application Ser. No. 14/194,252); U.S. Provisional Application Ser. No. 61/860,063 (now U.S. Non-Provisional patent application Ser. No. 14/276,575), U.S. Provisional Application Ser. No. 61/866,960 (now U.S. Non-Provisional patent application Ser. No. 14/461,044), U.S. Provisional Patent Application Ser. No. 61/869,526 (now U.S. Non-Provisional patent application Ser. No. 14/465,194), U.S. Provisional Patent Application Ser. No. 61/872,569 (now U.S. Non-Provisional patent application Ser. No. 14/471,982), US Provisional Patent Application Ser. No. 61/881,064 (now U.S. Non-Provisional patent application Ser. No. 14/494,274), U.S. Provisional Patent Application Ser. No. 61/894,263 (now U.S. Non-Provisional patent application Ser. No. 14/520,081), and U.S. Provisional Patent Application Ser. No. 61/909,786 (now U.S. Non-Provisional patent application Ser. No. 14/553,657), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wearable electromyography ("EMG") device, wherein the wearable EMG device includes a set of EMG sensors and a processor communicatively coupled to the set of EMG sensors, the method comprising:

detecting muscle activity of a user of the wearable EMG device by the set of EMG sensors, wherein the muscle activity corresponds to a user-performed gesture;

in response to detecting muscle activity of the user by the set of EMG sensors, providing a set of signals from the set of EMG sensors to the processor;

characterizing the set of signals as a first signal vector $\vec{s}_1$ by the processor;

determining a property of a first angle $\theta_1$ formed between the first signal vector $\vec{s}_1$ and a first gesture template vector $\vec{g}_1$ by the processor, wherein the first gesture template vector $\vec{g}_1$ represents a first gesture; and identifying the user-performed gesture by the processor, wherein identifying the user-performed gesture by the processor includes identifying the first gesture as the user-performed gesture by the processor if, at least, the property of the first angle $\theta_1$ satisfies a criterion.

2. The method of claim 1 wherein characterizing the set of signals as a first signal vector $\vec{s}_1$ by the processor includes determining at least one feature of each signal in the set of signals by the processor, each at least one feature selected from the group consisting of: an average value of the signal, a mean value of the signal, a median value of the signal, a mode value of the signal, a maximum value of the signal, a minimum value of the signal, a standard deviation of the signal, a mean power frequency of the signal, and a root mean squared ("RMS") value of the signal.

3. The method of claim 1 wherein determining a property of a first angle $\theta_1$ formed between the first signal vector $\vec{s}_1$ and a first gesture template vector $\vec{g}_1$ by the processor includes determining, by the processor, at least one property selected from the group consisting of: a magnitude of the first angle $\theta_1$, a cosine of the first angle $\theta_1$, and a sine of the first angle $\theta_1$.

4. The method of claim 1 wherein the property of the first angle $\theta_1$ does not satisfy the criterion, and wherein the method further comprises:

determining a property of a second angle $\theta_2$ formed between the first signal vector $\vec{s}_1$ and a second gesture template vector $\vec{g}_2$ by the processor, wherein the second gesture template vector $\vec{g}_2$ represents a second gesture, and wherein identifying the user-performed gesture by the processor includes:

identifying the second gesture as the user-performed gesture by the processor if, at least, the property of the second angle $\theta_2$ satisfies the criterion.

5. The method of claim 4 wherein the property of the second angle $\theta_2$ does not satisfy the criterion, and wherein the method further comprises:

until an angle $\theta^*$ having a property that satisfies the criterion is identified, iteratively:

determining a property of an angle $\theta_i$ formed between the first signal vector $\vec{s}_1$ and an $i^{th}$ gesture template vector $\vec{g}_i$ by the processor, wherein i>2 and the $i^{th}$ gesture template vector $\vec{g}_i$ represents an $i^{th}$ gesture;

and wherein, in response to identifying an angle $\theta^*$ having a property that satisfies the criterion, identifying the user-performed gesture by the processor includes:

stopping the iteration; and identifying, by the processor, the gesture that is represented by a gesture template vector $\vec{g}^*$ corresponding to the angle $\theta^*$ that satisfies the criterion as the user-performed gesture.

6. The method of claim 1, further comprising:

for each gesture template vector $\vec{g}_i$ in a library of gesture template vectors G, each gesture template vector $\vec{g}_i$ representing a respective gesture, determining a property of an angle $\theta_i$ formed between the first signal vector $\vec{s}_1$ and the gesture template vector $\vec{g}_i$ by the processor, wherein determining a property of an angle $\theta_i$ formed between the first signal vector $\vec{s}_1$ and the gesture template vector $\vec{g}_i$ by the processor for each gesture template vector $\vec{g}_i$ in the library of gesture template vectors G includes determining a property of a first angle $\theta_1$ formed between the first signal vector $\vec{s}_1$ and a first gesture template vector $\vec{g}_1$ by the processor; and wherein:

identifying the user-performed gesture by the processor includes identifying, by the processor, a gesture represented by a gesture template vector $\vec{g}_i$ from the library of gesture template vectors G for which the property of the angle $\theta_i$ satisfies a criterion, wherein identifying, by the processor, a gesture represented by a gesture template vector $\vec{g}_i$ from the library of gesture template vectors G for which the property of the angle $\theta_i$ satisfies a criterion includes identifying the first gesture as the user-performed gesture by the processor if, at least: i) the property of the first angle $\theta_1$ satisfies the criterion and ii) the property of the first angle $\theta_1$ better satisfies the criterion than the property of any other angle $\theta_i$.

7. The method of claim 1 wherein the wearable EMG device further includes at least one inertial sensor, and wherein the method further comprises:

detecting motion of the wearable EMG device by the at least one inertial sensor, wherein the motion corresponds to the user-performed gesture;

in response to detecting motion of the wearable EMG device by the at least one inertial sensor, providing at least one signal from the at least one inertial sensor to the processor; and processing the at least one signal from the at least one inertial sensor by the processor, and wherein identifying the user-performed gesture by the processor includes identifying the user-performed gesture by the processor based at least in part on an outcome of the processing the at least one signal from the at least one inertial sensor by the processor.

8. The method of claim 1, further comprising:

capturing a respective time-synchronized first portion of each signal in the set of signals by the processor, wherein characterizing the set of signals as a first signal vector $\vec{s}_1$ by the processor includes characterizing the time-synchronized first portions of the signals in the set of signals as the first signal vector $\vec{s}_1$ by the processor;

capturing a respective time-synchronized second portion of each signal in the set of signals by the processor;

characterizing the time-synchronized second portions of the signals in the set of signals as a second signal vector $\vec{s}_2$ by the processor;

determining a property of a second angle $\phi_1$ formed between the second signal vector $\vec{s}_2$ and the first gesture template vector $\vec{g}_1$ by the processor; and wherein:

identifying the user-performed gesture by the processor includes identifying the first gesture as the user-performed gesture by the processor if, at least: i) the property of the first angle $\theta_1$ satisfies the criterion, and ii) the property of the second angle $\phi_1$ satisfies the criterion.

9. The method of claim 1 wherein the wearable EMG device further includes a non-transitory processor-readable storage medium communicatively coupled to the processor, wherein the non-transitory processor-readable storage medium stores processor-executable gesture identification instructions, and wherein:

characterizing the set of signals as a first signal vector $\vec{s}_1$ by the processor includes executing, by the processor, a portion of the processor-executable gesture identification instructions to cause the processor to characterize the set of signals as a first signal vector $\vec{s}_1$;

determining a property of a first angle $\theta_1$ formed between the first signal vector $\vec{s}_1$ and a first gesture template vector $\vec{g}_1$ by the processor includes executing, by the processor, a portion of the processor-executable gesture identification instructions to cause the processor to determine a property of a first angle $\theta_1$ formed between the first signal vector $\vec{s}_1$ and a first gesture template vector $\vec{g}_1$; and identifying the user-performed gesture by the processor includes executing, by the processor, a portion of the processor-executable gesture identification instructions to cause the processor to identify the user-performed gesture.

10. The method of claim 1, further comprising:
in response to the user performing a reference gesture:
determining an orientation of the wearable EMG device on the user by the wearable EMG device; and
calibrating the first gesture template vector $\vec{g}_1$ by the wearable EMG device.

11. A wearable electromyography ("EMG") device comprising:
a set of EMG sensors responsive to muscle activity of a user of the wearable EMG device, the muscle activity corresponding to a user-performed gesture, wherein in response to the muscle activity the set of EMG sensors provide a set of signals;
a processor communicatively coupled to the set of EMG sensors; and
a non-transitory processor-readable storage medium communicatively coupled to the processor, wherein the non-transitory processor-readable storage medium stores processor-executable gesture identification instructions that, when executed by the processor, cause the processor to:
characterize the set of signals as a first signal vector $\vec{s}_1$;
determine a property of a first angle $\theta_1$ formed between the first signal vector $\vec{s}_1$ and a first gesture template vector $\vec{g}_1$, wherein the first gesture template vector $\vec{g}_1$ represents a first gesture; and
identify the user-performed gesture, wherein identifying the user-performed gesture includes identifying the first gesture as the user-performed if, at least, the property of the first angle $\theta_1$ satisfies a criterion.

12. The wearable EMG device of claim 11, further comprising:
at least one communication terminal communicatively coupled to the processor, the at least one communication terminal to transmit information about the user-performed gesture to a receiving device.

13. The wearable EMG device of claim 11, further comprising:
at least one inertial sensor communicatively coupled to the processor, the at least one inertial sensor responsive to motion corresponding to the user-performed gesture, wherein in response to motion the at least one inertial sensor provides at least one signal, and wherein the processor-executable gesture identification instructions that, when executed by the processor, cause the processor to identify the user-performed gesture cause the processor to identify the user-performed gesture based at least in part on the at least one signal provided by the at least one inertial sensor in response to the motion.

14. A method of operating a wearable electromyography ("EMG") device, wherein the wearable EMG device includes a set of EMG sensors and a processor communicatively coupled to the set of EMG sensors, the method comprising:
detecting muscle activity of a user of the wearable EMG device by the set of EMG sensors, wherein the muscle activity corresponds to a user-performed gesture;
in response to detecting muscle activity of the user by the set of EMG sensors, providing a set of signals from the set of EMG sensors to the processor;
characterizing the set of signals as a first signal vector $\vec{s}_1$ by the processor;
for each gesture template vector $\vec{g}_i$ in a library of gesture template vectors G, each gesture template vector $\vec{g}_i$ representing a respective gesture, determining, by the processor, a property of an angle $\theta_i$ formed between the first signal vector $\vec{s}_1$ and the gesture template vector $\vec{g}_i$; and
identifying the user-performed gesture by the processor based at least in part on the property of at least one angle $\theta_i$ formed between the first signal vector $\vec{s}_1$ and a gesture template vector $\vec{g}_i$.

15. The method of claim 14 wherein characterizing the set of signals as a first signal vector $\vec{s}_1$ by the processor includes determining at least one feature of each signal in the set of signals by the processor, each at least one feature selected from the group consisting of: an average value of the signal, a mean value of the signal, a median value of the signal, a mode value of the signal, a maximum value of the signal, a minimum value of the signal, a standard deviation of the signal, a mean power frequency of the signal, and a root mean squared ("RMS") value of the signal.

16. The method of claim 14 wherein determining, for each gesture template vector $\vec{g}_i$ in a library of gesture template vectors G, a property of an angle $\theta_i$ formed between the first signal vector $\vec{s}_1$ and the gesture template vector $\vec{g}_i$ by the processor includes determining, by the processor and for each gesture template vector $\vec{g}_i$ in the library of gesture template vectors G, at least one property selected from the group consisting of: a magnitude of the angle $\theta_i$, a cosine of the angle $\theta_i$, and a sine of the angle $\theta_i$.

17. The method of claim 14 wherein determining, for each gesture template vector $\vec{g}_i$ in a library of gesture template vectors G, a property of an angle $\theta_i$ formed between the first signal vector $\vec{s}_1$ and the gesture template vector $\vec{g}_i$ by the processor includes determining a property of a first angle $\theta_1$ formed between the first signal vector $\vec{s}_1$ and a first gesture template vector $\vec{g}_1$ by the processor, wherein the first gesture template vector $\vec{g}_1$ represents a first gesture, and wherein:
identifying the user-performed gesture by the processor based at least in part on the property of at least one angle $\theta_i$ formed between the first signal vector $\vec{s}_1$ and a gesture template vector $\vec{g}_i$ includes identifying the first gesture as the user-performed gesture by the processor if, at least, the property of the first angle $\theta_1$ satisfies a criterion.

18. The method of claim 14 wherein the wearable EMG device further includes at least one inertial sensor, and wherein the method further comprises:
detecting motion of the wearable EMG device by the at least one inertial sensor, wherein the motion corresponds to the user-performed gesture;
in response to detecting motion of the wearable EMG device by the at least one inertial sensor, providing at least one signal from the at least one inertial sensor to the processor; and
processing the at least one signal from the at least one inertial sensor by the processor, and wherein identifying the user-performed gesture by the processor based at least in part on the property of at least one angle $\theta_i$ formed between the first signal vector $\vec{s}_1$ and a gesture template vector $\vec{g}_i$ includes identifying the user-performed gesture by the processor based at least in part on an outcome of the processing the at least one signal from the at least one inertial sensor by the processor.

19. The method of claim 14, further comprising:
capturing a respective time-synchronized first portion of each signal in the set of signals by the processor, wherein characterizing the set of signals as a first signal vector $\vec{s}_1$ by the processor includes characterizing the time-synchronized first portions of the signals in the set of signals as the first signal vector $\vec{s}_1$ by the processor;
capturing a respective time-synchronized second portion of each signal in the set of signals by the processor;
characterizing the time-synchronized second portions of the signals in the set of signals as a second signal vector $\vec{s}_2$ by the processor; and
for each gesture template vector $\vec{g}_i$ in the library of gesture template vectors G, determining, by the processor, a property of an angle $\phi_i$ formed between the second signal vector $\vec{s}_2$ and the gesture template vector $\vec{g}_i$; and wherein:
identifying the user-performed gesture by the processor based at least in part on the property of at least one angle $\theta_i$ formed between the first signal vector $\vec{s}_1$ and a gesture template vector $\vec{g}_i$ includes identifying the user-performed gesture by the processor based at least in part on both i) the property of at least one angle $\theta_i$ formed between the first signal vector $\vec{s}_1$ and a gesture template vector $\vec{g}_i$, and ii) the property of at least one angle $\phi_i$ formed between the second signal vector $\vec{s}_2$ and a gesture template vector $\vec{g}_i$.

20. The method of claim 14 wherein the wearable EMG device further includes a non-transitory processor-readable storage medium communicatively coupled to the processor, wherein the non-transitory processor-readable storage medium stores processor-executable gesture identification instructions, and wherein:
characterizing the set of signals as a first signal vector $\vec{s}_1$ by the processor includes executing, by the processor, a portion of the processor-executable gesture identification instructions to cause the processor to characterize the set of signals as a first signal vector $\vec{s}_1$;
determining, by the processor, a property of an angle $\theta_i$ formed between the first signal vector $\vec{s}_1$ and the gesture template vector $\vec{g}_i$ for each gesture template vector $\vec{g}_i$ in a library of gesture template vectors G includes executing, by the processor, a portion of the processor-executable gesture identification instructions to cause the processor to determine a property of an angle $\theta_i$ formed between the first signal vector $\vec{s}_1$ and the gesture template vector $\vec{g}_i$ for each gesture template vector $\vec{g}_i$ in the library of gesture template vectors G; and
identifying the user-performed gesture by the processor based at least in part on the property of at least one angle $\theta_i$ formed between the first signal vector $\vec{s}_1$ and a gesture template vector $\vec{g}_i$ includes executing, by the processor, a portion of the processor-executable gesture identification instructions to cause the processor to identify the user-performed gesture by the processor based at least in part on the property of at least one angle $\theta_i$ formed between the first signal vector $\vec{s}_1$ and a gesture template vector $\vec{g}_i$.

21. The method of claim 14, further comprising:
in response to the user performing a reference gesture:
determining an orientation of the wearable EMG device on the user by the wearable EMG device; and
calibrating each gesture template vector $\vec{g}_i$ in the library of gesture template vectors G by the wearable EMG device.

22. A wearable electromyography ("EMG") device comprising:
a set of EMG sensors responsive to muscle activity of a user of the wearable EMG device, the muscle activity corresponding to a user-performed gesture, wherein in response to the muscle activity the set of EMG sensors provide a set of signals;
a processor communicatively coupled to the set of EMG sensors; and
a non-transitory processor-readable storage medium communicatively coupled to the processor, wherein the non-transitory processor-readable storage medium stores processor-executable gesture identification instructions that, when executed by the processor, cause the processor to:
characterize the set of signals as a first signal vector $\vec{s}_1$;
for each gesture template vector $\vec{g}_i$ in a library of gesture template vectors G, each gesture template vector $\vec{g}_i$ representing a respective gesture, determine a property of an angle $\theta_i$ formed between the first signal vector $\vec{s}_1$ and the gesture template vector $\vec{g}_i$; and identify the user-performed gesture based at least in part on the property of at least one angle $\theta_i$ formed between the first signal vector $\vec{s}_1$ and at least one gesture template vector $\vec{g}_i$.

23. The wearable EMG device of claim 22, further comprising:
at least one communication terminal communicatively coupled to the processor, the at least one communication terminal to transmit information about the user-performed gesture to a receiving device.

24. The wearable EMG device of claim 22, further comprising:
at least one inertial sensor communicatively coupled to the processor, the at least one inertial sensor responsive to motion corresponding to the user-performed gesture, wherein in response to motion the at least one inertial sensor provides at least one signal, and wherein the processor-executable gesture identification instructions that, when executed by the processor, cause the processor to identify the user-performed gesture based at least in part on the property of at least one angle $\theta_i$ formed between the first signal vector $\vec{s}_1$ and at least one gesture template vector $\vec{g}_i$ cause the processor to identify the user-performed gesture based at least in part on both: i) the property of at least one angle $\theta_i$ formed between the first signal vector $\vec{s}_1$ and at least one gesture template vector $\vec{g}_i$, and ii) the at least one signal provided by the at least one inertial sensor in response to the detected motion.

25. A method of operating a wearable electromyography ("EMG") device, wherein the wearable EMG device includes a set of EMG sensors and a processor communicatively coupled to the set of EMG sensors, the method comprising:
detecting muscle activity of a user of the wearable EMG device by the set of EMG sensors, wherein the muscle activity corresponds to a user-performed gesture;
in response to detecting muscle activity of the user by the set of EMG sensors, providing a set of signals from the set of EMG sensors to the processor;
until a same gesture is nominated as the user-performed gesture M times, where M≥2, iteratively:
capturing a respective time-synchronized portion of each signal in the set of signals by the processor;
characterizing the time-synchronized portions of the signals in the set of signals as a signal vector $\vec{s}$ by the processor;
for each gesture template vector $\vec{g}_i$ in a library of gesture template vectors G, each gesture template vector $\vec{g}_i$ representing a respective gesture, determining, by the processor, a property of an angle $\theta_i$ formed between the signal vector $\vec{s}$ and the gesture template vector $\vec{g}_i$; and
nominating, by the processor, a gesture as the user-performed gesture based on the determining, for each gesture template vector $\vec{g}_i$ in a library of gesture template vectors G, a property of an angle $\theta_i$ formed between the signal vector $\vec{s}$ and the gesture template vector $\vec{g}_i$;
and
in response to nominating a same gesture as the user-performed gesture M times:
stopping the iteration; and
identifying, by the processor, the user-performed gesture as the gesture that is nominated as the user-performed gesture M times.

26. The method of claim 25 wherein characterizing the time-synchronized portions of the signals in the set of signals as a signal vector $\vec{s}$ by the processor includes determining a respective feature of each respective time-synchronized portion of each signal in the set of signals by the processor, each respective feature selected from the group consisting of: an average value of the time-synchronized portion of the signal, a mean value of the time-synchronized portion of the signal, a median value of the time-synchronized portion of the signal, a mode value of the time-synchronized portion of the signal, a maximum value of the time-synchronized portion of the signal, a minimum value of the time-synchronized portion of the signal, a standard deviation of the time-synchronized portion of the signal, a mean power frequency of the time-synchronized portion of the signal, and a root mean squared ("RMS") value of the time-synchronized portion of the signal.

27. The method of claim 25 wherein the wearable EMG device further includes at least one inertial sensor, and wherein the method further comprises:
detecting motion of the wearable EMG device by the at least one inertial sensor, wherein the motion corresponds to the user-performed gesture;
in response to detecting motion of the wearable EMG device by the at least one inertial sensor, providing at least one signal from the at least one inertial sensor to the processor;
processing the at least one signal from the at least one inertial sensor by the processor; and
identifying, by the processor, the user-performed gesture based at least in part on both: i) the gesture that is nominated as the user-performed gesture M times, and ii) an outcome of the processing the at least one signal from the at least one inertial sensor by the processor.

28. The method of claim 25 wherein for each gesture template vector $\vec{g}_i$ in a library of gesture template vectors G, determining, by the processor, a property of an angle $\theta_i$ formed between the signal vector $\vec{s}$ and the gesture template vector $\vec{g}_i$ includes determining, by the processor, at least one property selected from the group consisting of: a magnitude of the angle $\theta_i$, a cosine of the angle $\theta_i$, and a sine of the angle $\theta_i$.

29. A wearable electromyography ("EMG") device comprising:
a set of EMG sensors responsive to muscle activity of a user of the wearable EMG device, the muscle activity corresponding to a user-performed gesture, wherein in response to the muscle activity the set of EMG sensors provide a set of signals;
a processor communicatively coupled to the set of EMG sensors; and
a non-transitory processor-readable storage medium communicatively coupled to the processor, wherein the non-transitory processor-readable storage medium stores processor-executable gesture identification instructions that, when executed by the processor, cause the processor to:
until a same gesture is nominated as the user-performed gesture M times, where M≥2, iteratively:
capture a respective time-synchronized portion of each signal in the set of signals;

characterize the time-synchronized portions of the signals in the set of signals as a signal vector $\vec{s}$;

for each gesture template vector $\vec{g}_i$ in a library of gesture template vectors G, each gesture template vector $\vec{g}_i$ representing a respective gesture, determine a property of an angle $\theta_i$ formed between the signal vector $\vec{s}$ and the gesture template vector $\vec{g}_i$; and nominate a gesture as the user-performed gesture based on determining, for each gesture template vector $\vec{g}_i$ in a library of gesture template vectors G, a property of an angle $\theta_i$ formed between the signal vector $\vec{s}$ and the gesture template vector $\vec{g}_i$; and in response to nominating a same gesture as the user-performed gesture M times:

stop the iteration; and identify the user-performed gesture as the gesture that is nominated as the user-performed gesture M times.

30. The wearable EMG device of claim 29, further comprising:

at least one communication terminal communicatively coupled to the processor, the at least one communication terminal to transmit information about the user-performed gesture to a receiving device.

31. The wearable EMG device of claim 29, further comprising:

at least one inertial sensor communicatively coupled to the processor, the at least one inertial sensor responsive to motion corresponding to the user-performed gesture, wherein in response to motion the at least one inertial sensor provides at least one signal, and wherein the processor-executable gesture identification instructions that, when executed by the processor, cause the processor to identify the user-performed gesture based at least in part on both: i) the gesture that is nominated as the user-performed gesture M times, and ii) an outcome of the processing the at least one signal from the at least one inertial sensor by the processor.

* * * * *